(12) United States Patent
Blumenthal et al.

(10) Patent No.: US 12,233,530 B2
(45) Date of Patent: Feb. 25, 2025

(54) SUPPORT STRUCTURE FOR USE WITH MODULAR STORAGE SYSTEM

(71) Applicant: Milwaukee Electric Tool Corporation, Brookfield, WI (US)

(72) Inventors: Aaron S. Blumenthal, Shorewood, WI (US); Ryan C. Dick, Sussex, WI (US); Aaron M. Williams, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 324 days.

(21) Appl. No.: 17/672,331

(22) Filed: Feb. 15, 2022

(65) Prior Publication Data

US 2022/0258324 A1    Aug. 18, 2022

Related U.S. Application Data

(63) Continuation of application No. PCT/US2022/015816, filed on Feb. 9, 2022.

(60) Provisional application No. 63/164,716, filed on Mar. 23, 2021, provisional application No. 63/149,874, filed on Feb. 16, 2021.

(51) Int. Cl.
  *B25H 3/06* (2006.01)
  *B25H 1/06* (2006.01)
  *B25H 1/12* (2006.01)

(52) U.S. Cl.
  CPC .................. *B25H 3/06* (2013.01); *B25H 1/06* (2013.01); *B25H 1/12* (2013.01)

(58) Field of Classification Search
  CPC ... B25H 3/04; B25H 3/06; B25H 1/06; B25H 1/12

USPC ......................................................... 211/198
  See application file for complete search history.

(56) References Cited

U.S. PATENT DOCUMENTS

| | | | | |
|---|---|---|---|---|
| 518,186 | A | * 4/1894 | Forrester | D06F 57/08 |
| | | | | 211/198 |
| 3,424,334 | A | 1/1969 | Goltz | |
| 3,873,114 | A | 3/1975 | Brown | |
| 4,113,056 | A | * 9/1978 | DeLorenzo | B25H 1/06 |
| | | | | 182/153 |
| 4,170,986 | A | * 10/1979 | Hinshaw | A61H 1/00 |
| | | | | 211/198 |

(Continued)

FOREIGN PATENT DOCUMENTS

| CN | 203344029 | 12/2013 |
|---|---|---|
| CN | 103552053 | 7/2015 |

(Continued)

OTHER PUBLICATIONS

32in. Adjustable Folding Sawhorse, [online]retrieved Feb. 11, 2022, available from https://www.homedepot.com/p/RIDGID-32-in-Adjustable-Folding-Sawhorse-230710/305360612?source=shoppingads&locale=en-US&&mtc=Shopping-VF-F_D25T-G-D25T-025_009_Port_POWER-RIDGID-NA-NA-SMART-2231655-WF-SMARTSHOPPING_Q1Q2PLUSUP_PL2&cm_mrnc=Shopping-VF-F_D25T-G-D25T-025_009_PORT_POWER-RIDGID-NA-NA-SMART-2231655-WF-SMARTSHOPPING_Q1Q2PLUSUP_PL2-71700000083187724-58700007049582709-92700063451361524&gclid=EAlaIQobChMlvp6Tg62v9QIVa21vBB1wDwvIEAQYASA BEqJ57vD_BwE&qclsrc=aw.ds#overlay, per homedepot.com available as early as Jul. 10, 2018.

(Continued)

*Primary Examiner* — Stanton L Krycinski
(74) *Attorney, Agent, or Firm* — Reinhart Boerner Van Deuren s.c.

(57) ABSTRACT

One or more devices are provided that are configured to detachably engage within a modular system. The one or (Continued)

more devices are positionable to provide a support structure upon which work can be performed.

11 Claims, 20 Drawing Sheets

(56) References Cited

U.S. PATENT DOCUMENTS

| | | | |
|---|---|---|---|
| 4,666,038 A * | 5/1987 | Minneman | A63B 55/10 211/198 |
| 5,098,235 A | 3/1992 | Svetlik et al. | |
| 5,224,531 A | 7/1993 | Blohm | |
| 5,284,256 A * | 2/1994 | Correll-Antoun | A47B 63/00 211/198 |
| 5,351,785 A * | 10/1994 | DuRapau | B25H 1/06 D25/67 |
| 5,393,030 A * | 2/1995 | Tarozzi | A47B 97/04 248/165 |
| 5,452,908 A | 9/1995 | Bencic | |
| 5,518,258 A | 5/1996 | Cox | |
| 5,560,448 A * | 10/1996 | Yemini | B25H 1/12 182/225 |
| 5,584,254 A * | 12/1996 | Williams | B25H 1/10 108/29 |
| D392,746 S * | 3/1998 | Dickinson | D25/67 |
| 5,855,351 A * | 1/1999 | Cziraky | A47B 97/04 248/460 |
| 5,890,613 A | 4/1999 | Williams | |
| 6,047,750 A | 4/2000 | Jensen | |
| 6,053,587 A | 4/2000 | Boerder | |
| D425,210 S * | 5/2000 | DuRapau | D25/67 |
| 6,164,413 A * | 12/2000 | Sagol | B25H 1/06 182/182.4 |
| 6,286,824 B1 | 9/2001 | Sagol | |
| 6,298,946 B1 * | 10/2001 | Yemini | B27B 21/00 182/183.1 |
| 6,305,498 B1 * | 10/2001 | Itzkovitch | B25H 1/06 182/155 |
| 6,422,343 B1 * | 7/2002 | Berg | B25H 1/06 182/182.3 |
| 6,488,119 B1 * | 12/2002 | DuRapau | B25H 1/06 182/225 |
| 6,565,165 B2 | 5/2003 | Switkes | |
| 6,659,440 B2 * | 12/2003 | Levy | B25H 1/06 269/45 |
| 6,685,032 B2 * | 2/2004 | Kaufmann | F16M 11/245 211/198 |
| 6,712,180 B2 * | 3/2004 | Levy | B25H 1/06 182/225 |
| 6,769,674 B2 * | 8/2004 | Chang | B25H 1/18 269/200 |
| 6,983,946 B2 | 1/2006 | Sullivan et al. | |
| 7,367,571 B1 | 5/2008 | Nichols | |
| 7,537,125 B2 * | 5/2009 | Plouchart | B25H 3/04 211/198 |
| 7,789,251 B1 * | 9/2010 | Clark | A47B 57/12 211/186 |
| 8,042,794 B2 * | 10/2011 | Marshall | B25H 1/04 269/139 |
| 8,740,010 B1 | 6/2014 | Page | |
| 8,757,322 B2 * | 6/2014 | Peter | E04G 1/32 182/153 |
| D708,351 S * | 7/2014 | Ken-Dror | D25/67 |
| 9,050,992 B2 | 6/2015 | Smith | |
| 9,347,229 B2 * | 5/2016 | Ken-Dror | B25H 1/06 |
| 9,375,835 B1 | 6/2016 | Lin | |
| 9,687,980 B2 * | 6/2017 | Yeh | B25H 3/04 |
| 9,844,870 B2 * | 12/2017 | Reinhart | B25H 3/00 |
| 10,124,479 B2 * | 11/2018 | Reinhart | B25H 1/06 |
| D839,449 S * | 1/2019 | Brunner | D25/67 |
| 10,507,572 B2 * | 12/2019 | Williams | B25H 1/04 |
| 10,583,962 B2 | 3/2020 | Brunner et al. | |
| 10,750,833 B2 | 8/2020 | Burchia | |
| 10,843,327 B2 | 11/2020 | Etzinger | |
| 11,084,163 B2 * | 8/2021 | Strempke | B25H 1/08 |
| 11,312,000 B2 * | 4/2022 | Sun | B25B 11/00 |
| 11,426,856 B2 * | 8/2022 | Baruch | B25H 1/18 |
| 11,554,478 B1 * | 1/2023 | Simoneau | B25H 1/0035 |
| 12,005,564 B2 * | 6/2024 | Garness | B25H 1/06 |
| 2002/0043432 A1 * | 4/2002 | Elwick | B25H 1/06 182/181.1 |
| 2002/0105129 A1 | 8/2002 | Levy | |
| 2002/0125072 A1 | 9/2002 | Levy | |
| 2003/0139080 A1 | 7/2003 | Lafragette et al. | |
| 2004/0124036 A1 | 7/2004 | Ulshafter, Jr. | |
| 2005/0224291 A1 * | 10/2005 | Fasanella | B25H 1/06 182/153 |
| 2005/0230188 A1 * | 10/2005 | Berg | B25H 1/06 182/153 |
| 2005/0247588 A1 * | 11/2005 | Hedges | B25H 3/06 206/373 |
| 2007/0138041 A1 | 6/2007 | Welsh | |
| 2011/0232805 A1 | 9/2011 | Despain | |
| 2011/0260588 A1 | 10/2011 | Lin | |
| 2013/0127129 A1 | 5/2013 | Bensman et al. | |
| 2014/0265440 A1 | 9/2014 | Chen et al. | |
| 2016/0101514 A1 * | 4/2016 | Moore | B25H 1/06 269/309 |
| 2016/0221177 A1 | 8/2016 | Reinhart | |
| 2016/0346912 A1 * | 12/2016 | Reinhart | B25H 1/06 |
| 2017/0166352 A1 | 6/2017 | Hoppe et al. | |
| 2017/0312909 A1 * | 11/2017 | Brunner | B25H 1/06 |
| 2018/0099403 A1 * | 4/2018 | Reinhart | B25H 1/005 |
| 2018/0099405 A1 | 4/2018 | Reinhart | |
| 2018/0141203 A1 | 5/2018 | Brunner | |
| 2018/0207788 A1 * | 7/2018 | Brunner | B25H 1/16 |
| 2018/0290289 A1 * | 10/2018 | Reinhart | B25H 1/06 |
| 2019/0225371 A1 | 7/2019 | Hoppe et al. | |
| 2020/0147781 A1 | 5/2020 | Squiers et al. | |
| 2020/0165036 A1 | 5/2020 | Squiers et al. | |
| 2022/0402113 A1 | 12/2022 | Brunner et al. | |
| 2023/0122425 A1 | 4/2023 | Camp et al. | |

FOREIGN PATENT DOCUMENTS

| | | | |
|---|---|---|---|
| CN | 204561464 | 8/2015 | |
| CN | 205238204 | 5/2016 | |
| CN | 106142031 | 11/2016 | |
| CN | 205835254 | 12/2016 | |
| CN | 208215295 | 12/2018 | |
| CN | 109227493 | 1/2019 | |
| CN | 109719687 | 5/2019 | |
| CN | 208930204 | 6/2019 | |
| CN | 111267056 | 6/2020 | |
| CN | 211841922 | 11/2020 | |
| CN | 212919321 | 4/2021 | |
| DE | 202014103695 | 12/2014 | |
| EP | 1724069 A2 | 11/2006 | |
| EP | 2537641 B1 | 9/2016 | |
| EP | 2338650 B1 | 10/2016 | |
| GB | 2211486 | 7/1989 | |
| GB | 2329355 A * | 3/1999 | B25H 1/06 |
| WO | WO03/064115 | 8/2003 | |
| WO | WO2014/125484 | 8/2014 | |
| WO | WO2017/191628 | 11/2017 | |
| WO | WO2021059264 | 4/2021 | |

OTHER PUBLICATIONS

Adjustable Height (25-32 in.) and Width (39.9-45.9 in.) Steel Sawhorse and Jobsite Table—1300 lb. Capacity, [online]retrieved Feb. 15, 2022, available from https://www.homedepot.com/p/TOUGHBUILT-Adjustable-Height-25-32-in-and-Width-39-9-45-9-in-Steel-Sawhorse-and-Jobsite-Table-1300-lb-Capacity-TB-C700/205870356, per homedepot.com available as early as Apr. 1, 2018.
Bora Portamate Speedhorse Sawhorse Pair—Two Pack, Table Stand with Folding Legs, Metal Top for 2X4, Heavy Duty Pro Bench Saw Horse for Woodworking, Carpenters, Contractors, PM-4500T, Date first available Jan. 15, 2019, [online]retrieved Feb. 11, 2022, https

(56) References Cited

OTHER PUBLICATIONS www.amazon.com/Bora-Portamate-Speedhorse-Sawhorse-Benchhorse/dp/B07RTM6BYZ/ref=asc_df_B07RTM6BYZ/?tag=&linkCode=df0&hvadid=366281307321&hvpos=&hvnetw=g&hvrand=13917007716214915688&hvpone=&hvptwo=&hvqmt=&hvdev=c&hvdvcmdi=&hvlocint=&hvlocphy=9018827&hvtargid=pla-79365590999681&ref=&adgrpid=75985294253&th=1 (Year: 2019).

International Search Report and Written Opinion for International Application No. PCT/US2022/015816, dated May 31, 2022, 11 pages.

Inter Partes Review No. 2024-01400, "Petition for Inter Partes Review of U.S. Pat. No. 11,365,026" Filed Sep. 17, 2024, 147 pages.

Exhibit 1001 in "Petition for Inter Partes Review of U.S. Pat. No. 11,365,026" Filed Sep. 17, 2024, 66 pages.
Exhibit 1002 in "Petition for Inter Partes Review of U.S. Pat. No. 11,365,026" Filed Sep. 17, 2024, 324 pages.
Exhibit 1003 in "Petition for Inter Partes Review of U.S. Pat. No. 11,365,026" Filed Sep. 17, 2024, 139 pages.
Exhibit 1004 in "Petition for Inter Partes Review of U.S. Pat. No. 11,365,026" Filed Sep. 17, 2024, 17 pages.
Exhibit 1005 in "Petition for Inter Partes Review of U.S. Pat. No. 11,365,026" Filed Sep. 17, 2024, 9 pages.
Exhibit 1006 in "Petition for Inter Partes Review of U.S. Pat. No. 11,365,026" Filed Sep. 17, 2024, 21 pages.
Exhibit 1007 in "Petition for Inter Partes Review of U.S. Pat. No. 11,365,026" Filed Sep. 17, 2024, 16 pages.
Exhibit 1008 in "Petition for Inter Partes Review of U.S. Pat. No. 11,365,026" Filed Sep. 17, 2024, 31 pages.
Exhibit 1009 in "Petition for Inter Partes Review of U.S. Pat. No. 11,365,026" Filed Sep. 17, 2024, 6 pages.
Exhibit 1010 in "Petition for Inter Partes Review of U.S. Pat. No. 11,365,026" Filed Sep. 17, 2024, 4 pages.
Exhibit 1011 in "Petition for Inter Partes Review of U.S. Pat. No. 11,365,026" Filed Sep. 17, 2024, 16 pages.
Exhibit 1012 in "Petition for Inter Partes Review of U.S. Pat. No. 11,365,026" Filed Sep. 17, 2024, 8 pages.
Exhibit 1013 in "Petition for Inter Partes Review of U.S. Pat. No. 11,365,026" Filed Sep. 17, 2024, 19 pages.
Exhibit 1014 in "Petition for Inter Partes Review of U.S. Pat. No. 11,365,026" Filed Sep. 17, 2024, 35 pages.
Exhibit 1015 in "Petition for Inter Partes Review of U.S. Pat. No. 11,365,026" Filed Sep. 17, 2024, 11 pages.
Exhibit 1016 in "Petition for Inter Partes Review of U.S. Pat. No. 11,365,026" Filed Sep. 17, 2024, 193 pages.
Exhibit 1017 in "Petition for Inter Partes Review of U.S. Pat. No. 11,365,026" Filed Sep. 17, 2024, 29 pages.
Exhibit 1018 in "Petition for Inter Partes Review of U.S. Pat. No. 11,365,026" Filed Sep. 17, 2024, 15 pages.
Exhibit 1019 in "Petition for Inter Partes Review of U.S. Pat. No. 11,365,026" Filed Sep. 17, 2024, 19 pages.
Exhibit 1020 in "Petition for Inter Partes Review of U.S. Pat. No. 11,365,026" Filed Sep. 17, 2024, 18 pages.
Exhibit 1021 in "Petition for Inter Partes Review of U.S. Pat. No. 11,365,026" Filed Sep. 17, 2024, 313 pages.
Exhibit 1030 in "Petition for Inter Partes Review of U.S. Pat. No. 11,365,026" Filed Sep. 17, 2024, 95 pages.
Exhibit 1031 in "Petition for Inter Partes Review of U.S. Pat. No. 11,365,026" Filed Sep. 17, 2024, 5 pages.
Exhibit 1032 in "Petition for Inter Partes Review of U.S. Pat. No. 11,365,026" Filed Sep. 17, 2024, 19 pages.

Inter Partes Review No. 2024-01401, "Petition for Inter Partes Review of U.S. Pat. No. 11,794,952" Filed Sep. 17, 2024, 165 pages.

Exhibit 1001 in "Petition for Inter Partes Review of U.S. Pat. No. 11,794,952" Filed Sep. 17, 2024, 67 pages.
Exhibit 1002 Part 1 in "Petition for Inter Partes Review of U.S. Pat. No. 11,794,952" Filed Sep. 17, 2024, 227 pages.
Exhibit 1002 Part 2 in "Petition for Inter Partes Review of U.S. Pat. No. 11,794,952" Filed Sep. 17, 2024, 278 pages.
Exhibit 1003 in "Petition for Inter Partes Review of U.S. Pat. No. 11,794, 952" Filed Sep. 17, 2024, 168 pages.
Exhibit 1004 in "Petition for Inter Partes Review of U.S. Pat. No. 11,794,952" Filed Sep. 17, 2024, 17 pages.
Exhibit 1005 in "Petition for Inter Partes Review of U.S. Pat. No. 11,794,952" Filed Sep. 17, 2024, 9 pages.
Exhibit 1006 in "Petition for Inter Partes Review of U.S. Pat. No. 11,794,952" Filed Sep. 17, 2024, 21 pages.
Exhibit 1007 in "Petition for Inter Partes Review of U.S. Pat. No. 11,794,952" Filed Sep. 17, 2024, 16 pages.
Exhibit 1008 in "Petition for Inter Partes Review of U.S. Pat. No. 11,794,952" Filed Sep. 17, 2024, 31 pages.
Exhibit 1009 in "Petition for Inter Partes Review of U.S. Pat. No. 11,794,952" Filed Sep. 17, 2024, 6 pages.
Exhibit 1010 in "Petition for Inter Partes Review of U.S. Pat. No. 11,794,952" Filed Sep. 17, 2024, 4 pages.
Exhibit 1011 in "Petition for Inter Partes Review of US Pat. No. 11,794, 952" Filed Sep. 17, 2024, 16 pages.
Exhibit 1012 in "Petition for Inter Partes Review of U.S. Pat. No. 11,794,952" Filed Sep. 17, 2024, 8 pages.
Exhibit 1013 in "Petition for Inter Partes Review of U.S. Pat. No. 11,794,952" Filed Sep. 17, 2024, 19 pages.
Exhibit 1014 in "Petition for Inter Partes Review of U.S. Pat. No. 11,794,952" Filed Sep. 17, 2024, 35 pages.
Exhibit 1015 in "Petition for Inter Partes Review of U.S. Pat. No. 11,794,952" Filed Sep. 17, 2024, 11 pages.
Exhibit 1016 in "Petition for Inter Partes Review of U.S. Pat. No. 11,794,952" Filed Sep. 17, 2024, 193 pages.
Exhibit 1017 in "Petition for Inter Partes Review of U.S. Pat. No. 11,794,952" Filed Sep. 17, 2024, 29 pages.
Exhibit 1018 in "Petition for Inter Partes Review of U.S. Pat. No. 11,794,952" Filed Sep. 17, 2024, 15 pages.
Exhibit 1019 in "Petition for Inter Partes Review of U.S. Pat. No. 11,794,952" Filed Sep. 17, 2024, 19 pages.
Exhibit 1020 in "Petition for Inter Partes Review of U.S. Pat. No. 11,794,952" Filed Sep. 17, 2024, 18 pages.
Exhibit 1021 in "Petition for Inter Partes Review of U.S. Pat. No. 11,794,952" Filed Sep. 17, 2024, 313 pages.
Exhibit 1022 in "Petition for Inter Partes Review of U.S. Pat. No. 11,794,952" Filed Sep. 17, 2024, 324 pages.
Exhibit 1023 in "Petition for Inter Partes Review of U.S. Pat. No. 11,794,952" Filed Sep. 17, 2024, 5 pages.
Exhibit 1024 in "Petition for Inter Partes Review of U.S. Pat. No. 11,794,952" Filed Sep. 17, 2024, 7 pages.
Exhibit 1025 in "Petition for Inter Partes Review of U.S. Pat. No. 11,794,952" Filed Sep. 17, 2024, 15 pages.
Exhibit 1026 in "Petition for Inter Partes Review of U.S. Pat. No. 11,794,952" Filed Sep. 17, 2024, 37 pages.
Exhibit 1027 in "Petition for Inter Partes Review of U.S. Pat. No. 11,794,952" Filed Sep. 17, 2024, 7 pages.
Exhibit 1028 in "Petition for Inter Partes Review of U.S. Pat. No. 11,794,952" Filed Sep. 17, 2024, 33 pages.
Exhibit 1030 in "Petition for Inter Partes Review of U.S. Pat. No. 11,794,952" Filed Sep. 17, 2024, 95 pages.
Exhibit 1031 in "Petition for Inter Partes Review of U.S. Pat. No. 11,794,952" Filed Sep. 17, 2024, 5 pages.
Exhibit 1032 in "Petition for Inter Partes Review of U.S. Pat. No. 11,794,952" Filed Sep. 17, 2024, 60 pages.

* cited by examiner

SUPPORT STRUCTURE FOR USE WITH MODULAR STORAGE SYSTEM

CROSS-REFERENCE TO RELATED PATENT APPLICATIONS

The present application is a continuation of International Application No. PCT/US2022/015816, filed Feb. 9, 2022, which claims the benefit of and priority to U.S. Provisional Application No. 63/164,716, filed on Mar. 23, 2021, and U.S. Provisional Application No. 63/149,874, filed on Feb. 16, 2021, each of which are incorporated herein by reference in its entirety.

BACKGROUND OF THE INVENTION

The present disclosure is directed generally to the field of tool storage systems and related devices. The present disclosure relates specifically to a device that includes a support structure and a coupling mechanism to detachably couple the device to another device or container, such as in a modular storage system.

Tool storage units are often used to transport tools and tool accessories. Some storage units are designed to incorporate into a modular storage system. Within a modular storage system, different units, devices and/or containers may provide varying functions, such as providing a device that provides a support structure, such as a saw horse.

SUMMARY OF THE INVENTION

One embodiment of the invention relates to a foldable support structure including a first wall, a second wall pivotally coupled to the first wall, a third wall pivotally coupled to the first wall, and a first plurality of coupling components. The second wall is pivotally coupled to the first wall such that the first wall and second wall actuate between an open configuration and a closed configuration. The first wall and the second wall are configured to collectively support the foldable support structure in an upright orientation when the second wall and first wall are arranged in an open configuration. The third wall is configured to interface with the second wall when the second wall and first wall are arranged in an open configuration. The first plurality of coupling components extend from a first face of the third wall. The first plurality of coupling components are configured to couple to a lower surface of a stackable storage unit.

Another embodiment of the invention relates to a foldable support system including a first foldable support structure and a second foldable support structure. The first foldable support structure includes a first housing, a first leg pivotally coupled to a first end of the first housing, a second leg pivotally coupled to a second end of the first housing opposite the first end, the first leg and the second leg configured to collectively support the first housing, a first coupling element coupled to the first housing, and a first female coupler coupled to the first housing. The first female coupler is configured to couple to a first surface of a stackable storage unit. The second foldable support structure includes a second housing, a first leg pivotally coupled to a first end of the second housing, a second leg pivotally coupled to a second end of the second housing opposite the first end, the first leg and the second leg configured to collectively support the second housing, a second coupling element coupled to the second housing, and a second female coupler coupled to the second housing. The second coupling element is configured to detachably engage with the first coupling element of the first foldable support structure. The second female coupler is coupled to the second housing. The second female coupler is configured to couple to the first surface of the stackable storage unit.

Another embodiment of the invention relates to a foldable structure includes a housing comprising a first surface and a second surface opposite the first surface, a first leg pivotally coupled to a first end of the housing, a second leg pivotally coupled to a second end of the housing opposite the first end, the first leg and the second leg configured to collectively support the housing, a plurality of male couplers coupled to a first surface of the housing, and a plurality of female couplers coupled to a second surface of the housing. The plurality of male couplers are configured to couple to an upper surface of a stackable storage unit. The plurality of female couplers are configured to couple to a lower surface of a stackable storage unit opposite the upper surface.

Another embodiment of the invention relates to a foldable support structure, such as a saw horse, including a first wall, a second wall pivotally coupled to the first wall, a third wall pivotally coupled to the first wall, and a first plurality of coupling components extending from a first face of the third wall. The foldable work structure is configured to stand in an upright configuration when the second wall is pivoted away from the first wall. The third wall is configured to interface with the second wall when the foldable work structure is configured in an open configuration. The first plurality of coupling components are configured to couple to a first surface of a stackable storage unit.

In a specific embodiment, the foldable support structure includes a second plurality of coupling components extending from a second face of the third wall opposite the first face. The second plurality of coupling components are configured to couple to a second surface of the stackable storage unit opposite the first surface.

Another embodiment of the invention relates to a foldable support system including a first foldable support structure and a second foldable support structure. The first foldable support structure includes a housing, a first leg pivotally coupled to a first end of the housing, a second leg pivotally coupled to a second end of the housing opposite the first end, a first coupling element extending from the housing, and a first plurality of coupling components extending from the housing. The first plurality of coupling components are configured to couple to a first surface of a stackable storage unit. The second foldable support structure includes a housing, a first leg pivotally coupled to a first end of the housing, a second leg pivotally coupled to a second end of the housing opposite the first end, a second coupling element extending from the housing, and a second plurality of coupling components extending from the housing. The second plurality of coupling components are configured to couple to the first surface of a stackable storage unit. The second coupling element is configured to selectively engage with the first coupling element of the first foldable structure.

Another embodiment of the invention relates to a device including a first panel and a second panel pivotally connected to the first panel. The device actuates between an open position, in which the first panel and second panel are pivoted apart, and a closed position, in which the first panel and the second panel are pivoted together. The first panel includes a coupling mechanism engageable to a modular storage unit.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a device for providing a work structure/surface, such as a support structure, are shown. One or more of the devices are configured to selectively couple and decouple to storage units within a modular storage system. At constructions sites there can be limited support structures and/or platforms to support objects, documents, etc. Described herein are various portable and stackable devices that provide one or more support structures and/or surfaces, such as a collapsible support structure, that can be selectively coupled and decoupled with a modular system, such as a modular tool storage system. It is contemplated herein that the one or more devices described herein are used as a sawhorse and/or in a similar way to how a sawhorse is used.

Figure 1:
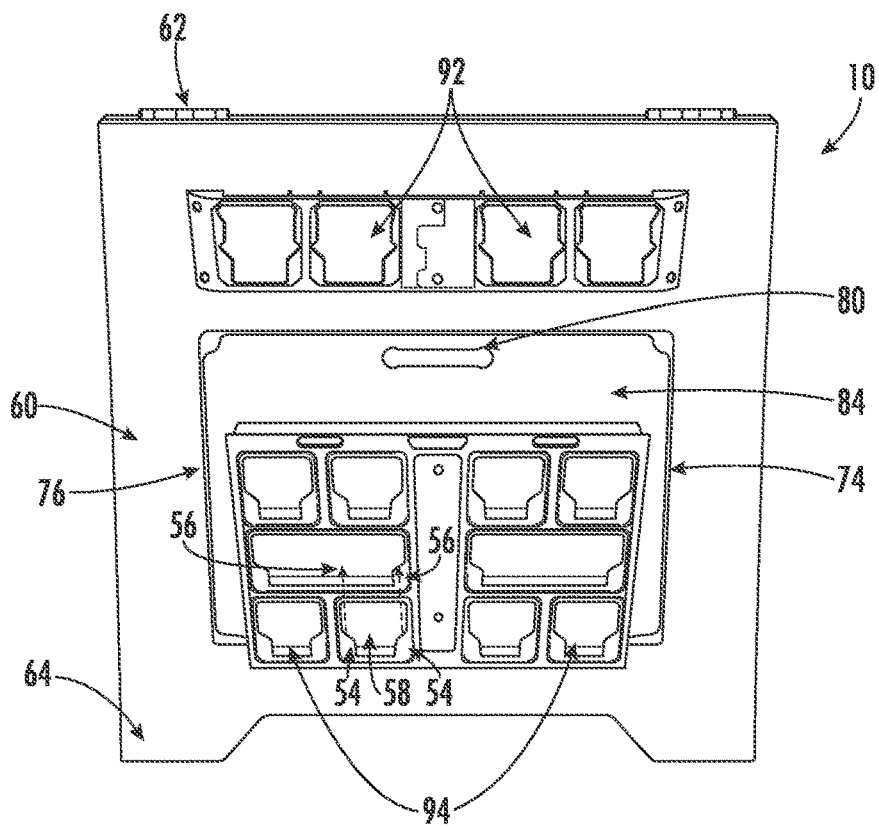
FIG. 1 is a front view of a support structure, according to an exemplary embodiment.
Figure 2:
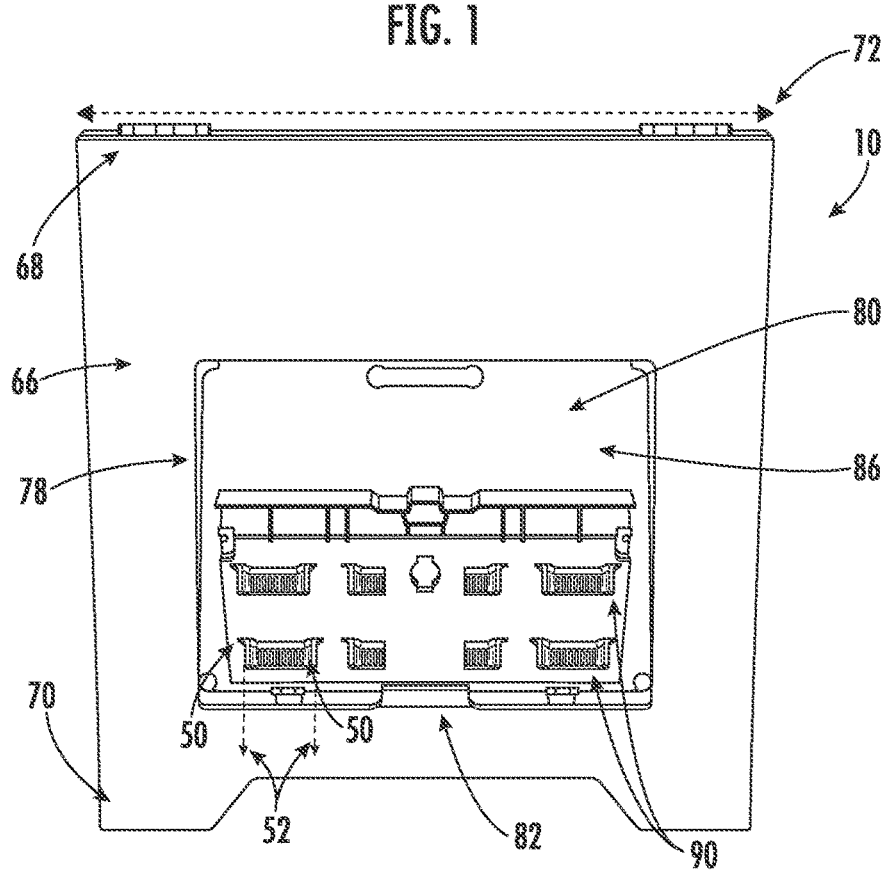
FIG. 2 is a rear view of the support structure of FIG. 1, according to an exemplary embodiment.
Figure 3:
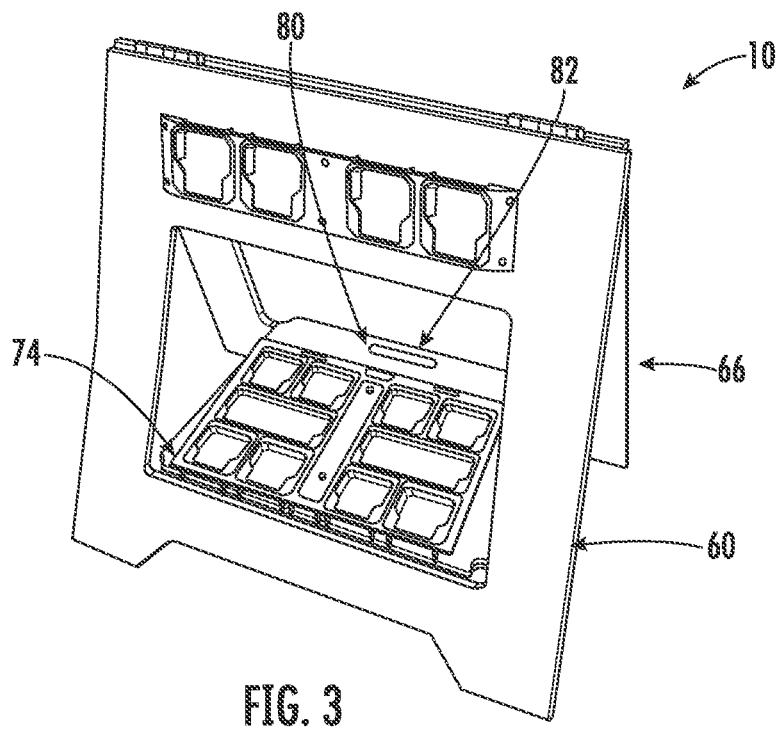
FIG. 3 is a perspective view of the support structure of FIG. 1, according to an exemplary embodiment.
Figure 4:
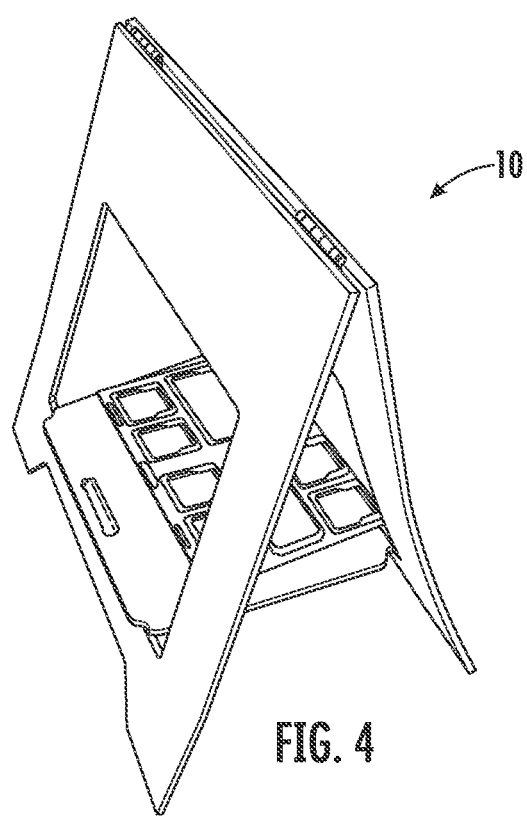
FIG. 4 is a perspective view of the support structure of FIG. 1, according to an exemplary embodiment.
Figure 5:
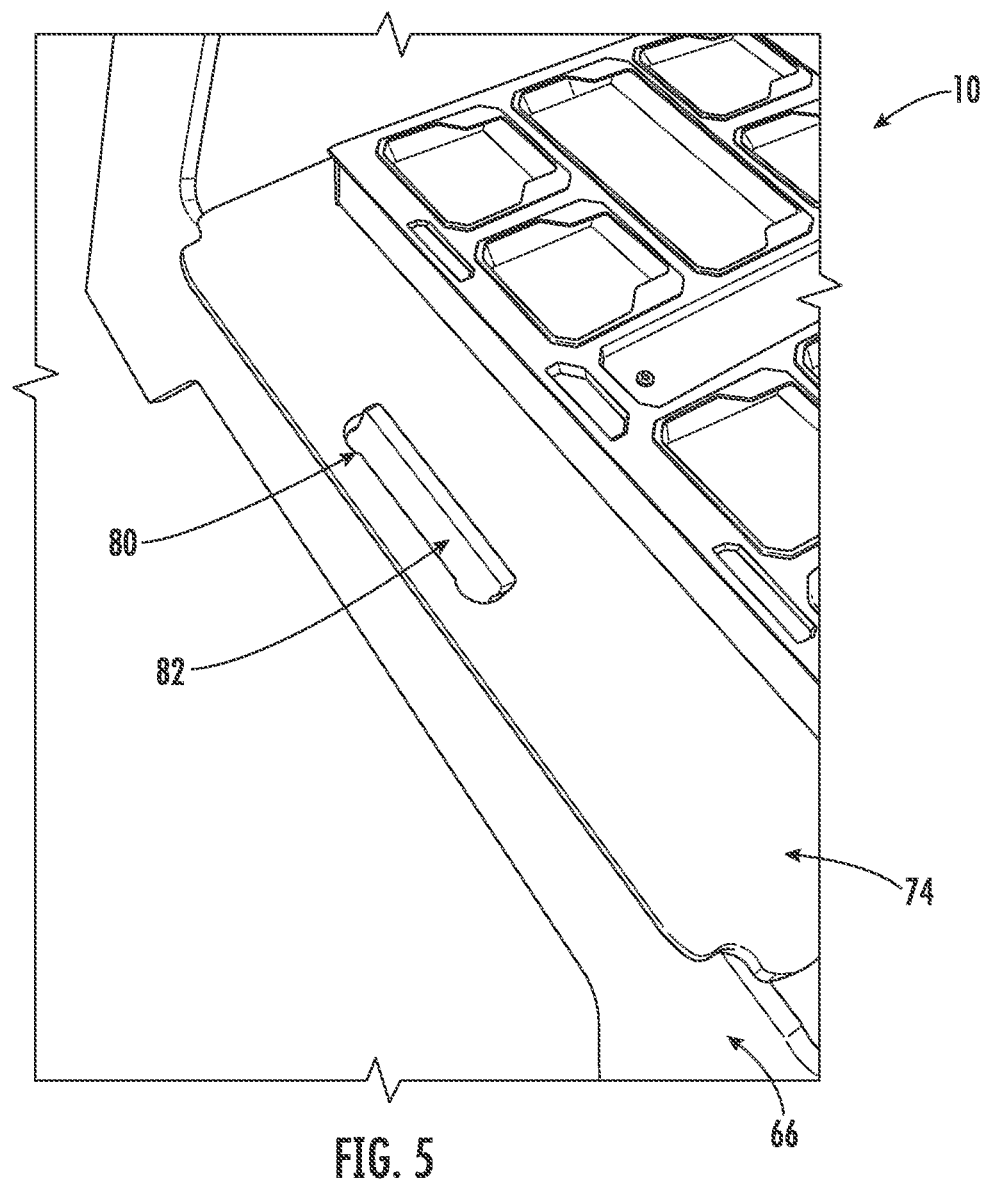
FIG. 5 is a detailed perspective view of the support structure of FIG. 1, according to an exemplary embodiment.
Figure 6:
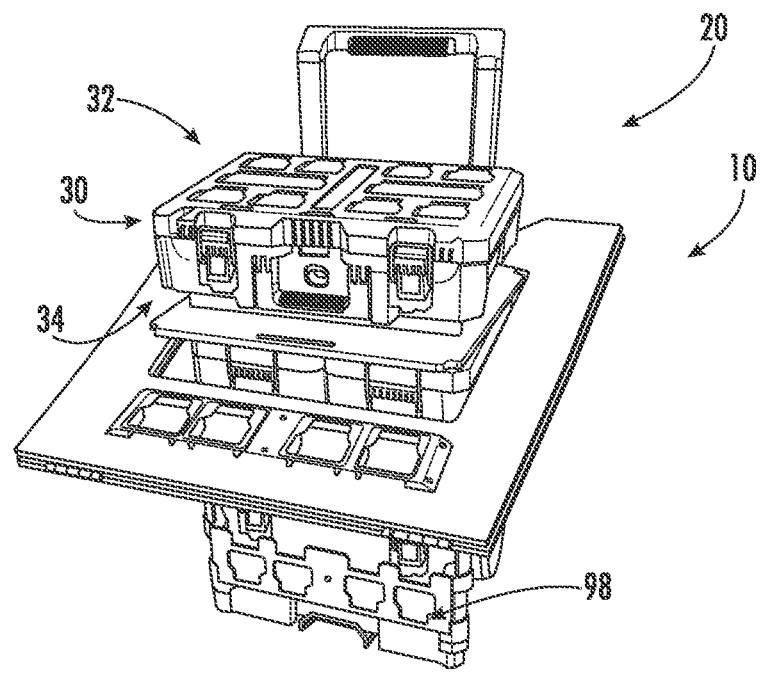
FIG. 6 is a perspective view of a modular system including the support structure of FIG. 1, according to an exemplary embodiment.
Figure 7:
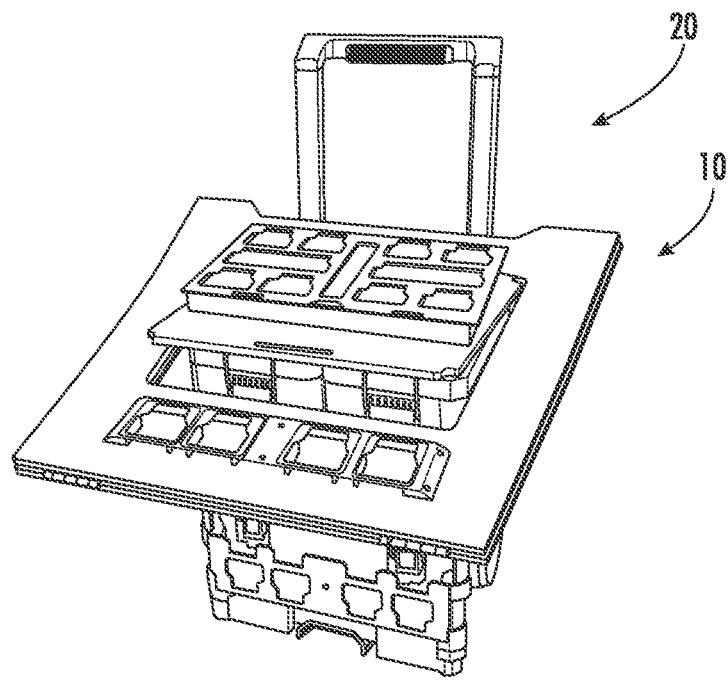
FIG. 7 is a perspective view of the modular system of FIG. 6 including the support structure of FIG. 1, according to an exemplary embodiment.
Figure 8:
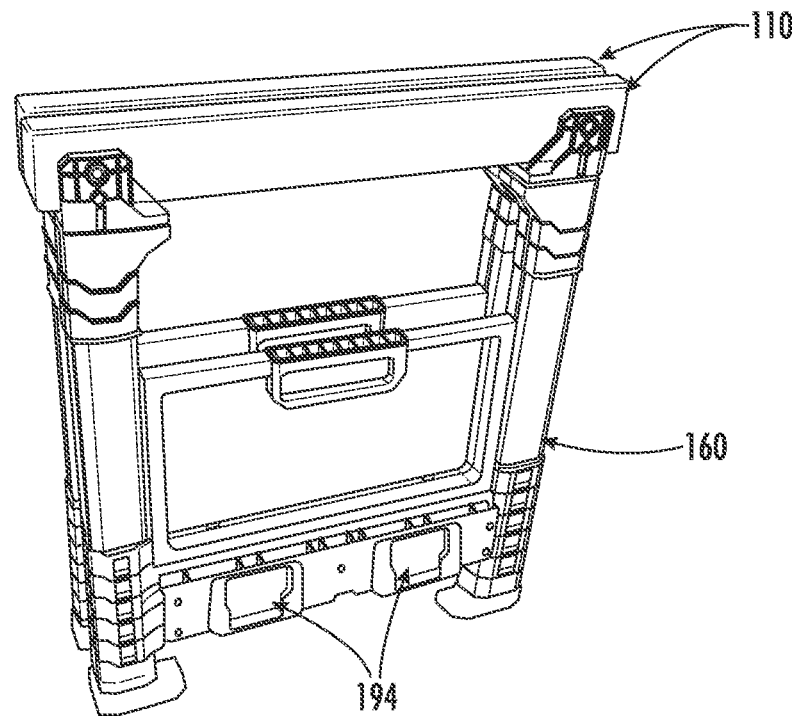
FIG. 8 is a perspective view of two support structures, according to an exemplary embodiment.
Figure 9:
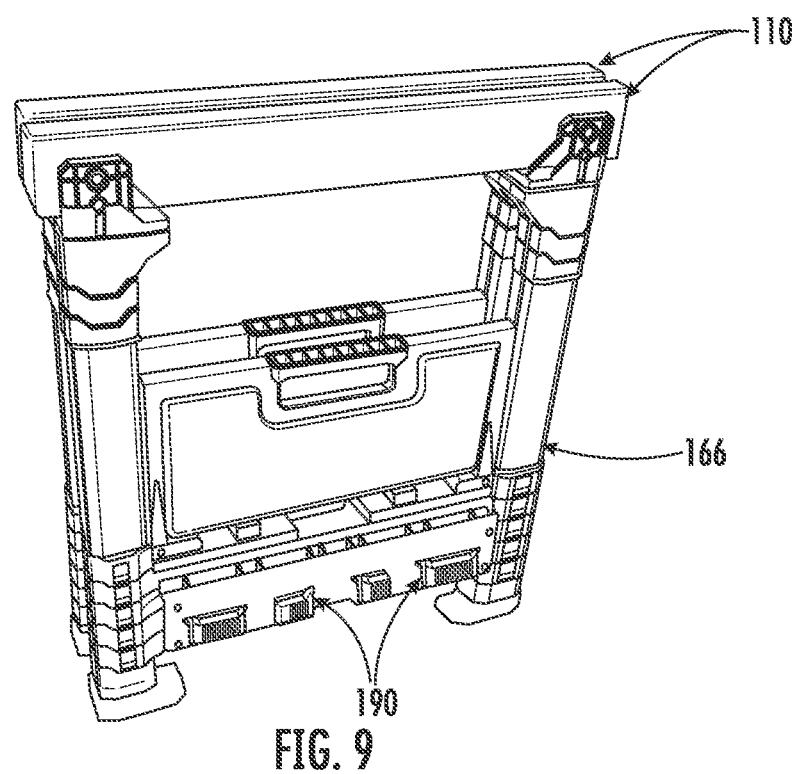
FIG. 9 is a perspective view of the two support structures of FIG. 8, according to an exemplary embodiment.

Referring to FIGS. 1-7, various aspects of foldable support structure 10 are depicted. Support structure 10 includes a first support structure, shown as first wall 60, and a second support structure, shown as second wall 66, pivotally coupled to the first wall 60 such that the first wall 60 and second wall 66 actuate between an open configuration and a closed configuration. In a specific embodiment, first wall 60 and second wall 66 are panels. First wall 60 and the second wall 66 are configured to collectively support the foldable support structure 10 in an upright orientation when the second wall 66 and first wall 60 are arranged in an open configuration. Support structure 10 includes one or more coupling mechanisms to couple to a modular system. In FIGS. 1-2, support structure 10 is shown in the closed position such that the first wall 60 and second wall 66 are pivoted together and/or nearly together. In FIG. 3, the first wall 60 and second wall 66 are pivoted open so that support structure 10 can be placed upright on a surface, such as the ground. Referring to FIGS. 6-7, support structure 10 is shown coupled within a modular system, shown as modular storage system 20.

When support structure 10 is positioned in the closed configuration (FIG. 1), lower end 64 of first wall 60 is pivoted towards lower end 70 of second wall 66. When support structure is positioned in the open configuration (FIG. 3), lower end 64 of first wall 60 is pivoted away from lower end 70 of second wall 66 and protrusion 82 from second wall 66 is disposed within aperture 80 of third wall 74 such that third wall 74 biases first wall 60 and second wall 66 to remain in the open configuration. Stated another way, the third wall 74 includes an aperture 80 configured to receive a protrusion 82 extending from the second wall 66 when the third wall 74 is configured in the open configuration and/or foldable support structure 10 is arranged in the upright orientation.

An upper end 62 of first wall 60 is pivotally coupled to an upper end 68 of second wall 66. First wall 60 rotates with respect to second wall 66 about axis 72. Upper end 62 of the first wall 60 and the upper end 68 of the second wall 66 are configured to collectively support an object placed on the foldable support structure 10 (e.g., to support a beam, a platform upon which to work) when the foldable support structure 10 is arranged in the upright orientation.

Third wall 74 is pivotally coupled to first wall 60. Third wall 74 is configured to interface with the second wall 66 when the second wall 66 and first wall 60 are arranged in an open configuration. Third wall 74 actuates with respect to the first wall 60 between a closed configuration and an open configuration in which the foldable support structure 10 is arranged in the upright orientation. In a specific embodiment, opening 76 in first wall 60 is configured to receive third wall 74. In a specific embodiment, opening 78 in second wall 66 is similarly shaped to opening 76 in first wall 60.

In a specific embodiment, first face 84 of third wall 74 includes one or more coupling elements, shown as plurality of coupling components 94. In various embodiments, the plurality of coupling components 94 are configured to couple to a lower surface 34 of a stackable storage unit 30. In a specific embodiment, second face 86 of third wall 74 includes one or more coupling elements, shown as plurality of coupling components 90. In various embodiments, the second plurality of coupling components 90 are configured to couple to an upper surface 32 of the stackable storage unit 30. In a specific embodiment, one or more coupling elements, shown as plurality of coupling components 92, are coupled to and extend from first wall 60 above opening 76.

In various embodiments, the plurality of coupling components 94 include a plurality of female couplers (e.g., each coupling component 94 is a female coupler), each of which include a rib 54 extending along axis 56 above and offset from a recessed portion 58 of the respective female coupler. In various embodiments, the female couplers each include two ribs 54 extending above and offset from a recessed portion 58 of the respective female coupler. In various embodiments, the plurality of coupling components 92 include a plurality of female couplers configured to couple to the lower surface 34 of the stackable storage unit 30, similar to coupling components 94. In various embodiments, the second plurality of coupling components 90 include a plurality of male couplers (e.g., each coupling component 92 is a male coupler), each of which include a tongue 50 extending along axis 52 extending above and offset from the second face 86 of the third wall 74. In various embodiments, the second plurality of coupling components 90 include a plurality of male couplers (e.g., each coupling component 92 is a male coupler), each of which include two tongues 50 extending above and offset from the second face 86 of the third wall 74.

In various embodiments, a first female coupler of the plurality of coupling components 90 (e.g., female couplers) includes a first rib 54 extending along a first axis 56, a first male coupler of the plurality of coupling components 92 (e.g., male couplers) include a first tongue 50 extending along a second axis 52, and the first axis 56 and the second axis 52 are parallel to each other (e.g., the axes are parallel and extending along opposite sides of third wall 74).

In use, plurality of coupling components 90, 92 and/or 94 are configured to be coupled to a modular unit, shown as modular storage unit 30. In a specific embodiment, plurality of coupling components 90 are configured to be coupled to upper surface 32 of modular storage unit 30, and plurality of coupling components 92 and plurality of coupling components 94 are configured to be coupled to lower surface 34 of modular storage unit 30. In another configuration, support structure 10 is coupled to one or more coupling elements, shown as plurality of coupling components 98, on a front of modular storage system 20.

Figure 10:
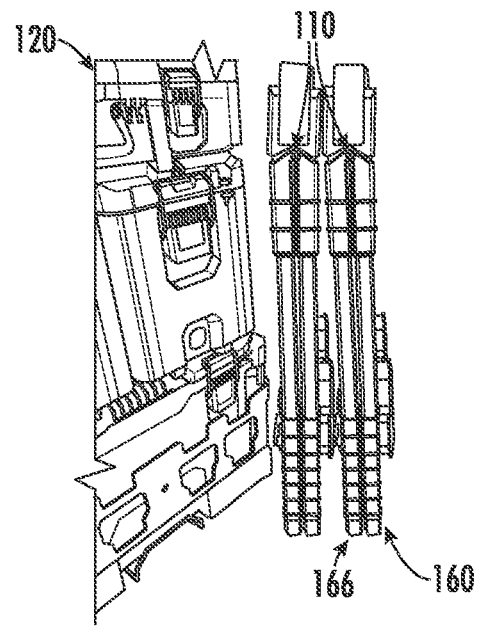
FIG. 10 is a side view of the two support structures of FIG. 8 in front of a modular system, according to an exemplary embodiment.
Figure 11:
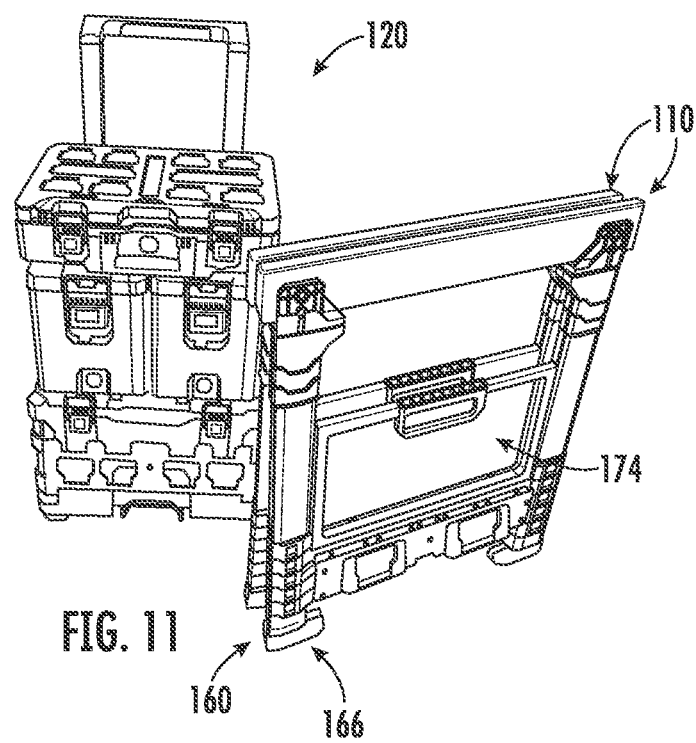
FIG. 11 is a perspective view of the two support structures of FIG. 8 next to the modular system of FIG. 10, according to an exemplary embodiment.
Figure 12:
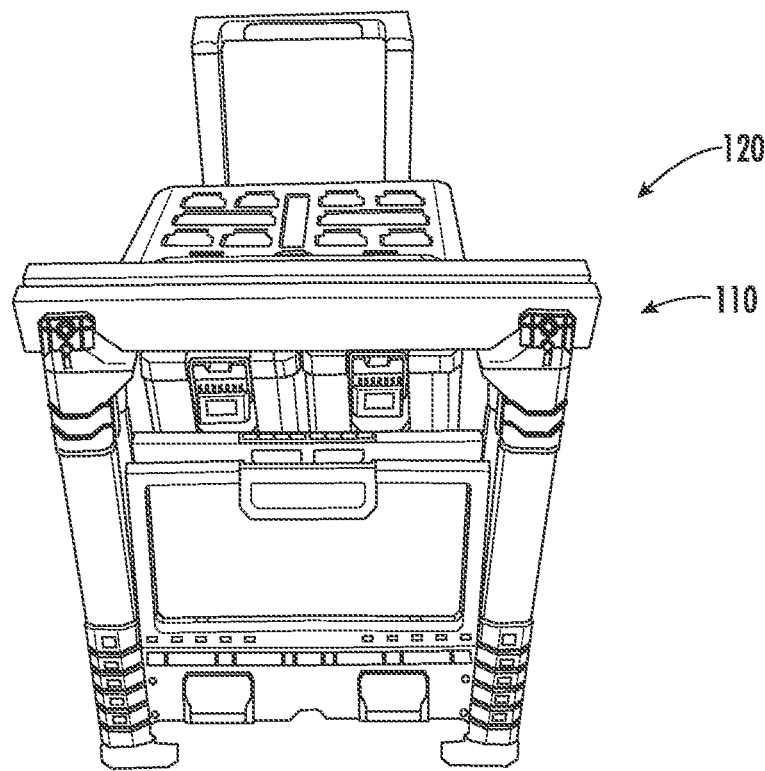
FIG. 12 is a perspective view of the two support structures of FIG. 8 coupled to a front of the modular system of FIG. 10, according to an exemplary embodiment.
Figure 13:
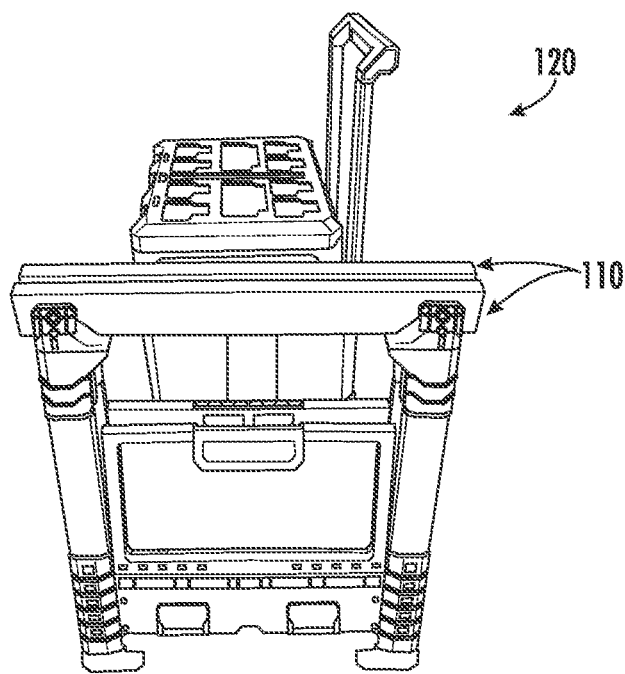
FIG. 13 is a perspective view of the two support structures of FIG. 8 next to the modular system of FIG. 10, according to an exemplary embodiment.
Figure 14:
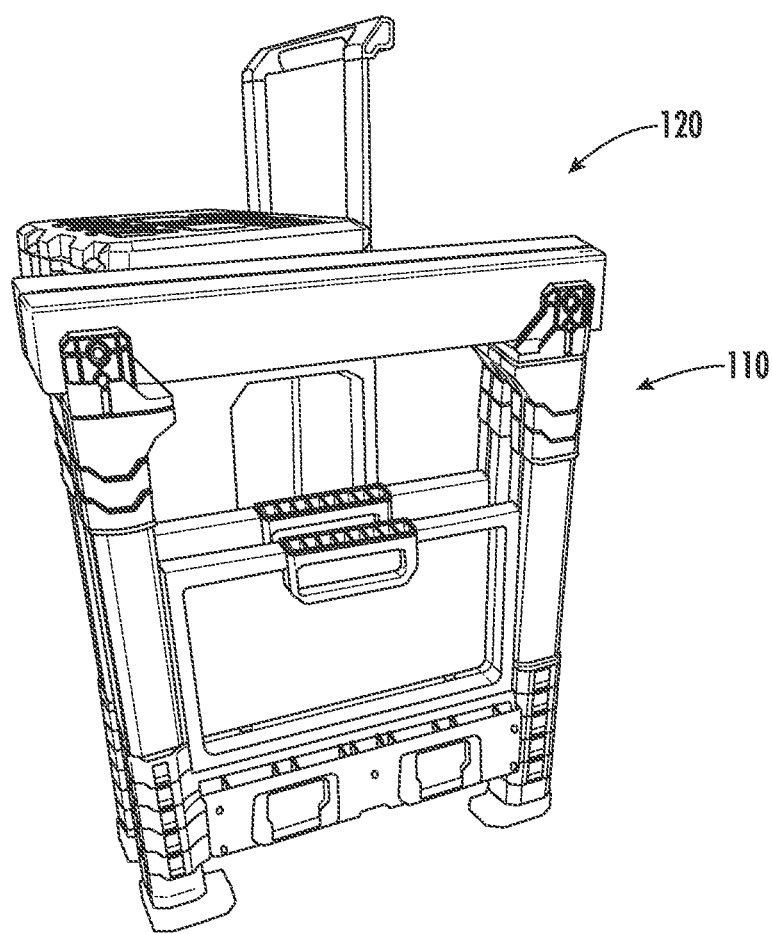
FIG. 14 is a perspective view of the two support structures of FIG. 8 next to the modular system of FIG. 10, according to an exemplary embodiment.
Figure 15:
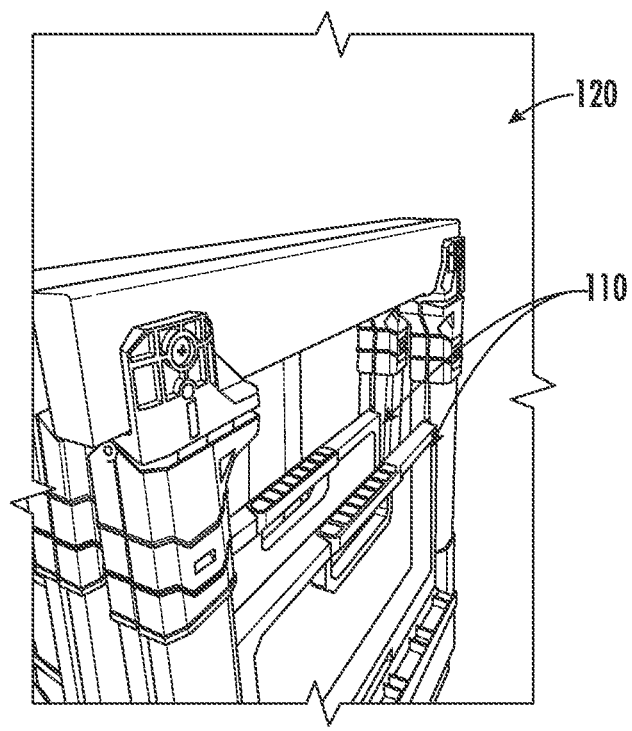
FIG. 15 is a perspective view of the two support structures of FIG. 8 next to the modular system of FIG. 10, according to an exemplary embodiment.
Figure 16:
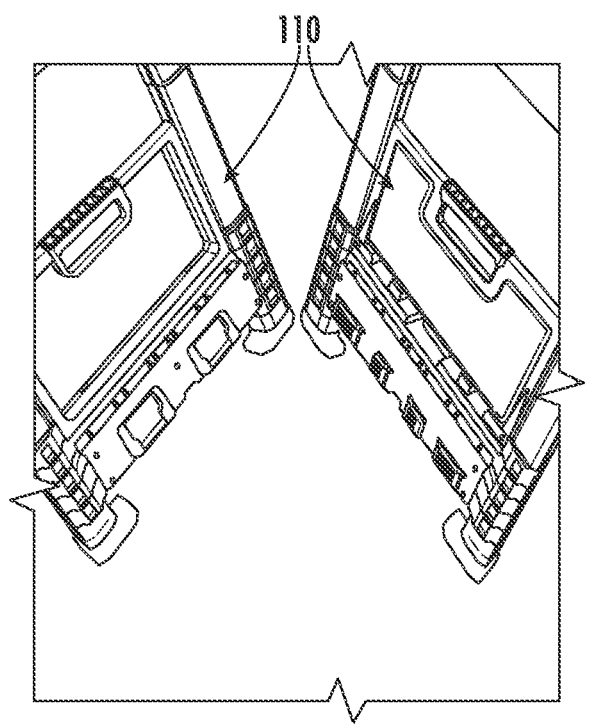
FIG. 16 is a perspective view of the two support structures of FIG. 8 next to the modular system of FIG. 10, according to an exemplary embodiment.

Referring to FIGS. 8-17, various aspects of support structure 110 are depicted. Support structure 110 is substantially the same as support structure 10 except for the differences discussed herein. Support structure 110 includes a first wall 160 and a second wall 166 detachably coupled together. Referring to FIGS. 10-11, support structure 110 can be coupled to a coupling mechanism on a modular system, shown as modular storage system 120. Referring to FIG. 12, support structure 110 is coupled to modular storage system 120 for transporting of support structure 110. Referring to FIG. 16, opposing surfaces of the first wall 160 and the second wall 166 include one or more coupling mechanisms to couple the first wall 160 and second wall 166 together. The coupling mechanisms are compatible with the coupling mechanisms in modular storage system 120.

Third wall 174 extends between first wall 160 and second wall 166. In use, third wall 174 actuates between a horizontal configuration, when support structure 110 is in an open configuration, and a vertical configuration, when support structure 110 is in an closed configuration.

First wall 160 includes one or more coupling elements, shown as plurality of coupling components 194. Second wall 166 includes one or more coupling elements, shown as plurality of coupling components 190.

Figure 17:
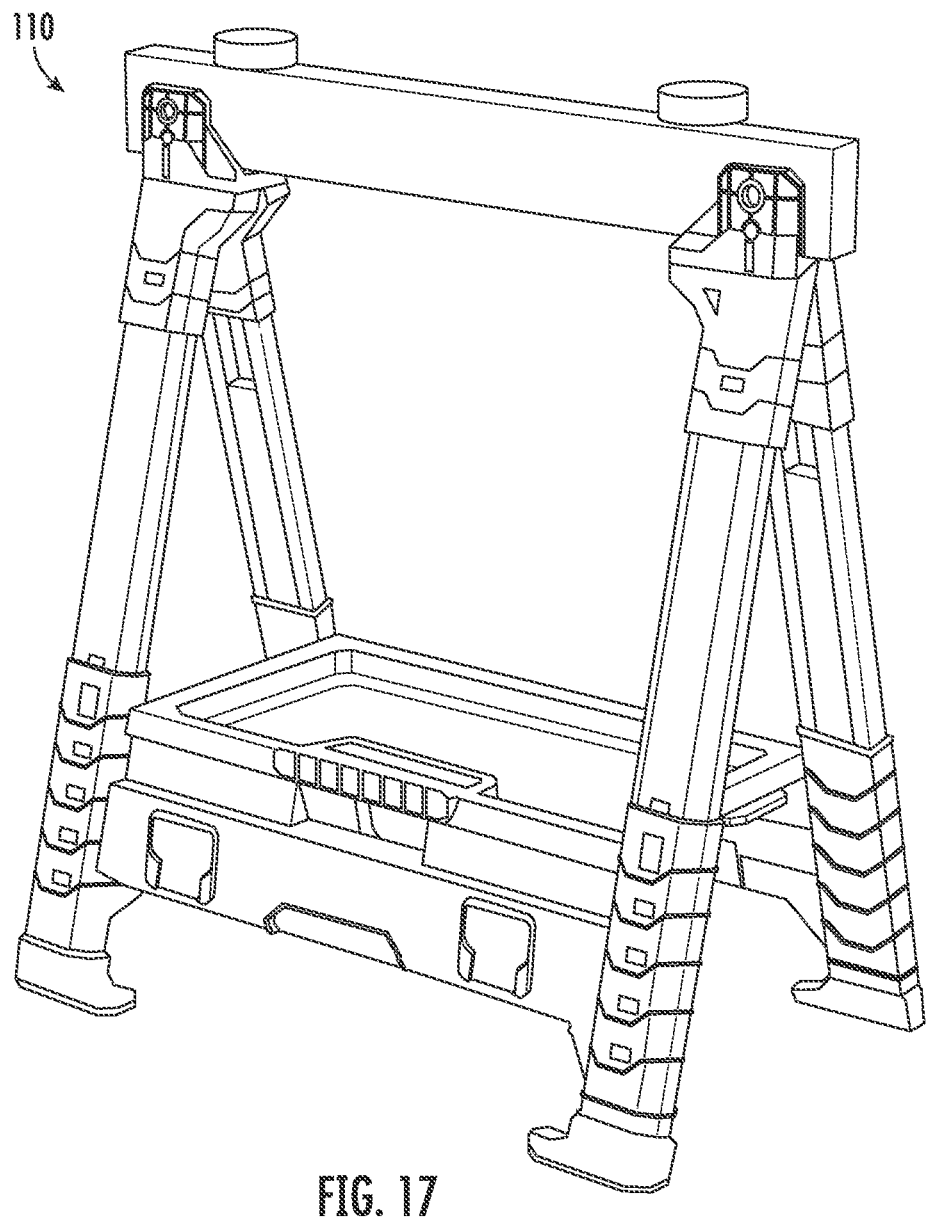
FIG. 17 is a perspective view of the two support structures of FIG. 8, according to an exemplary embodiment.
Figure 18:
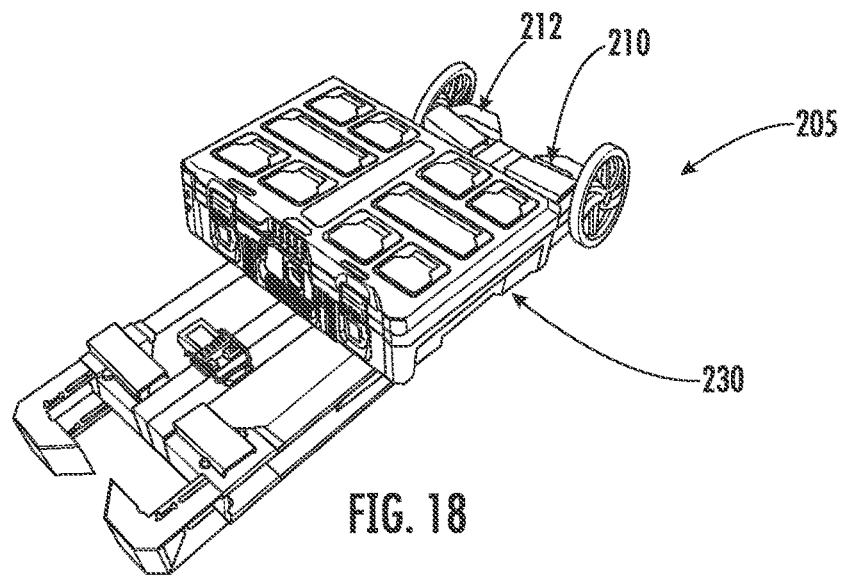
FIG. 18 is a perspective view of a support system, according to an exemplary embodiment.
Figure 19:
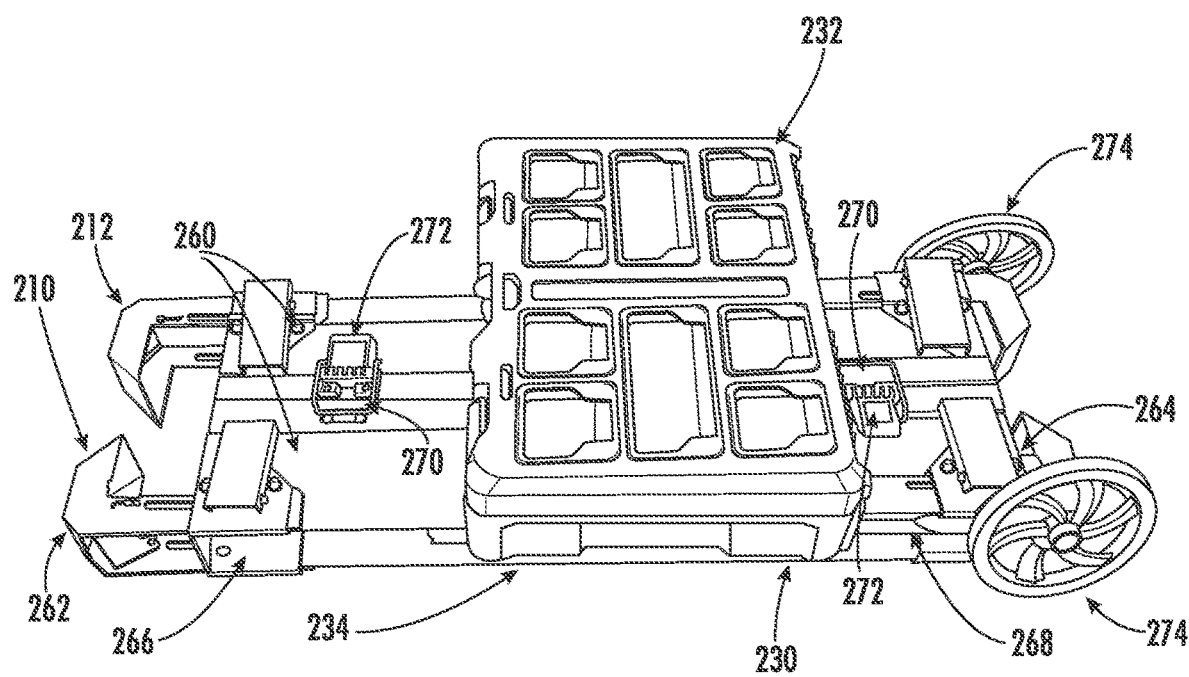
FIG. 19 is a perspective view of the support system of FIG. 18, according to an exemplary embodiment.
Figure 20:
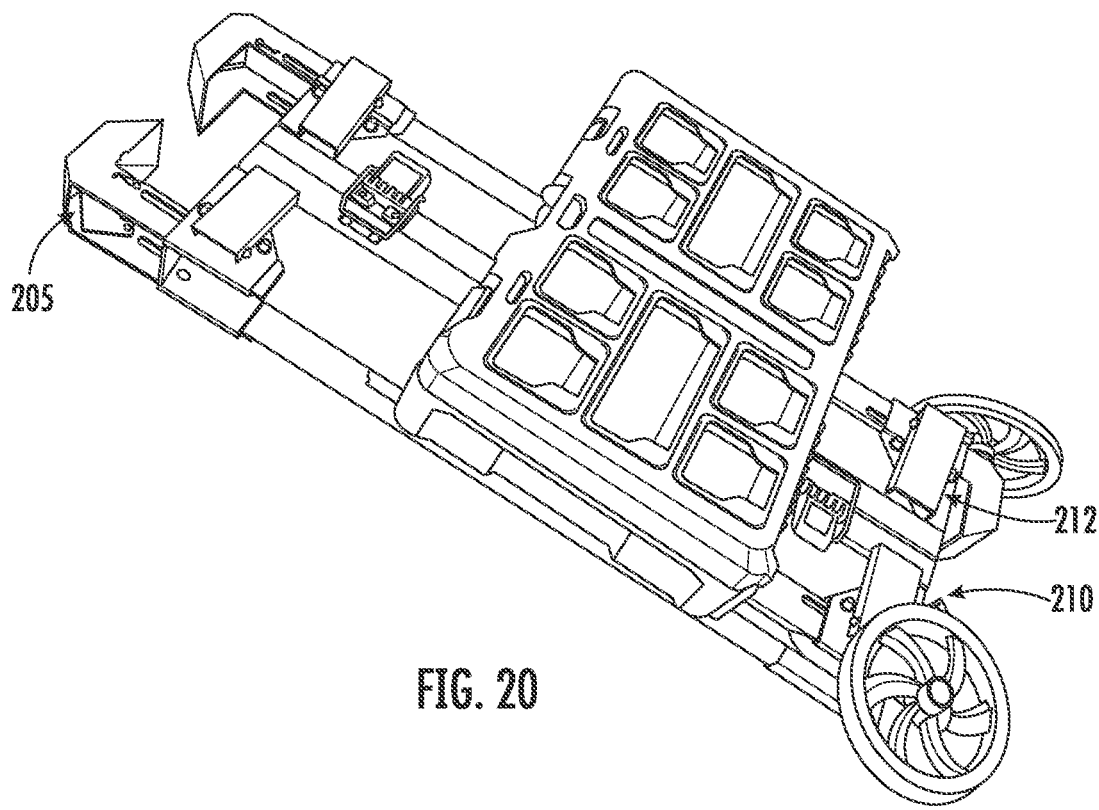
FIG. 20 is a perspective view of the support system of FIG. 18, according to an exemplary embodiment.
Figure 21:
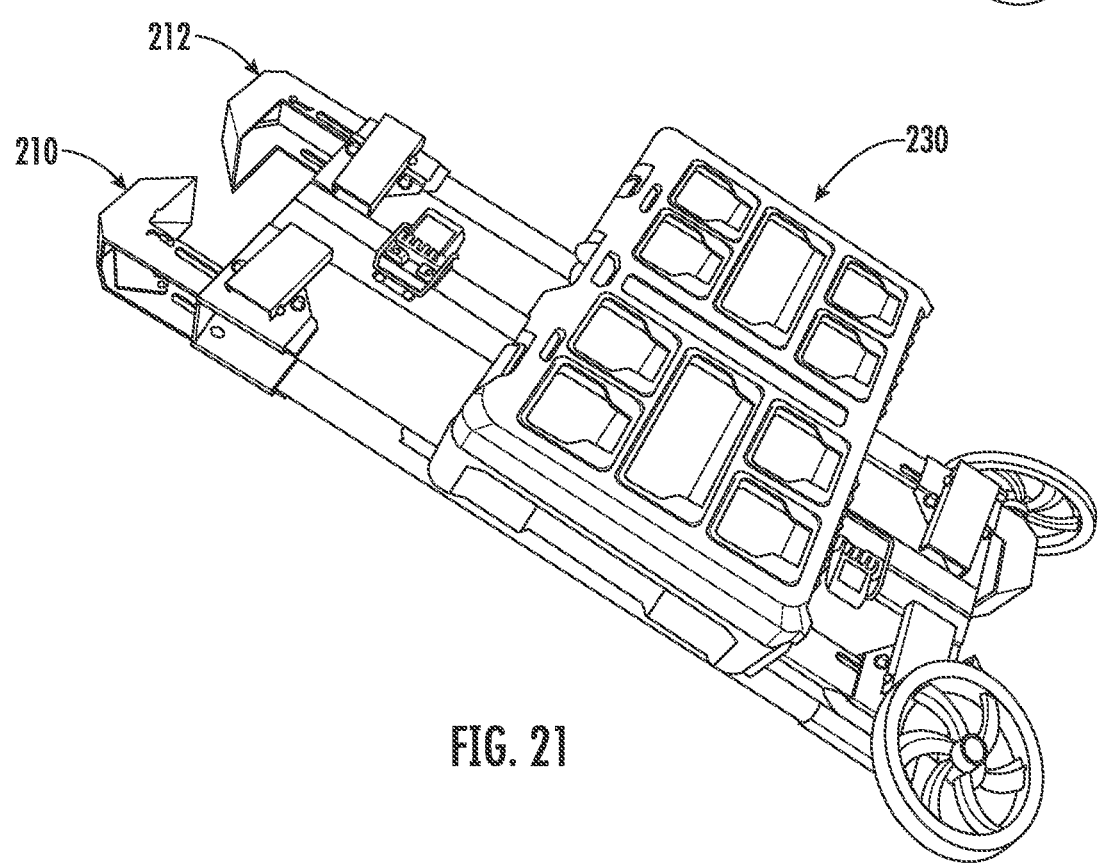
FIG. 21 is a perspective view of the support system of FIG. 18, according to an exemplary embodiment.
Figure 22:
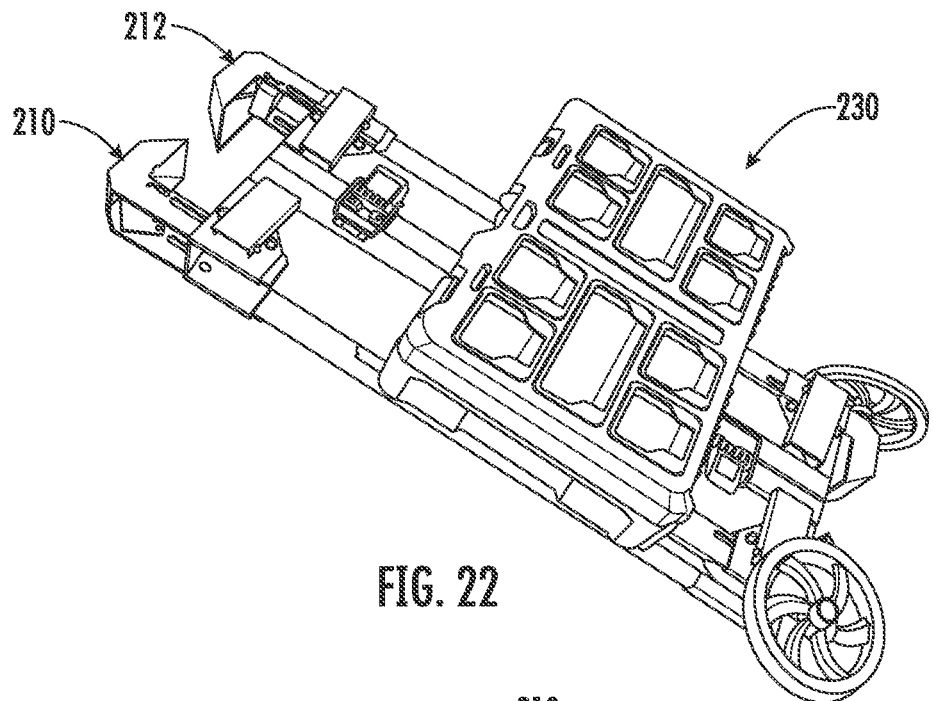
FIG. 22 is a perspective view of the support system of FIG. 18, according to an exemplary embodiment.
Figure 23:
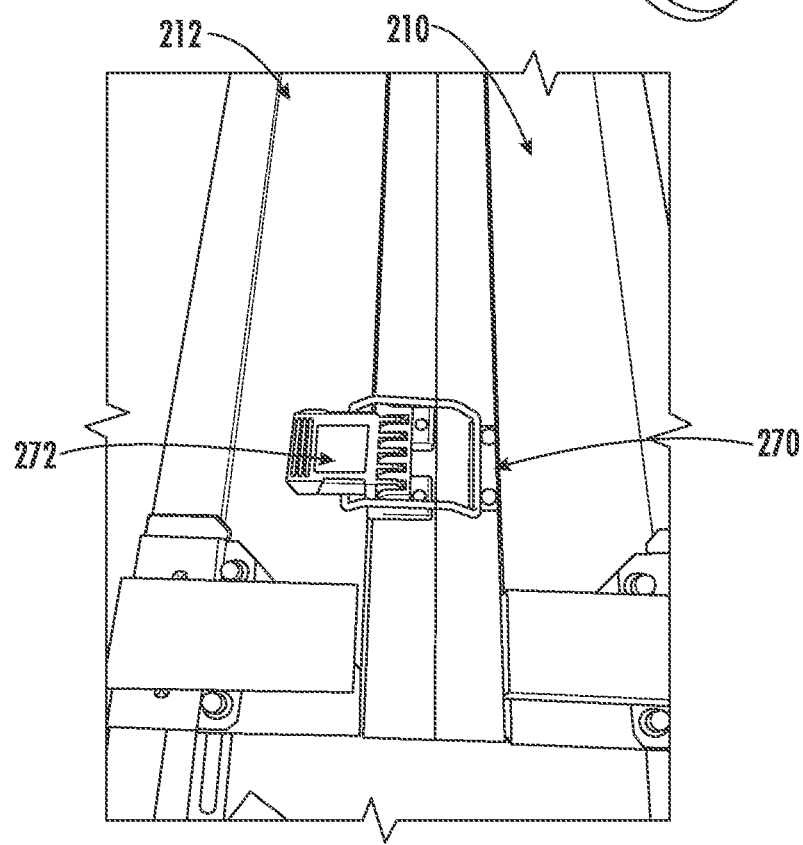
FIG. 23 is a detailed top view of the support system of FIG. 18, according to an exemplary embodiment.
Figure 24:
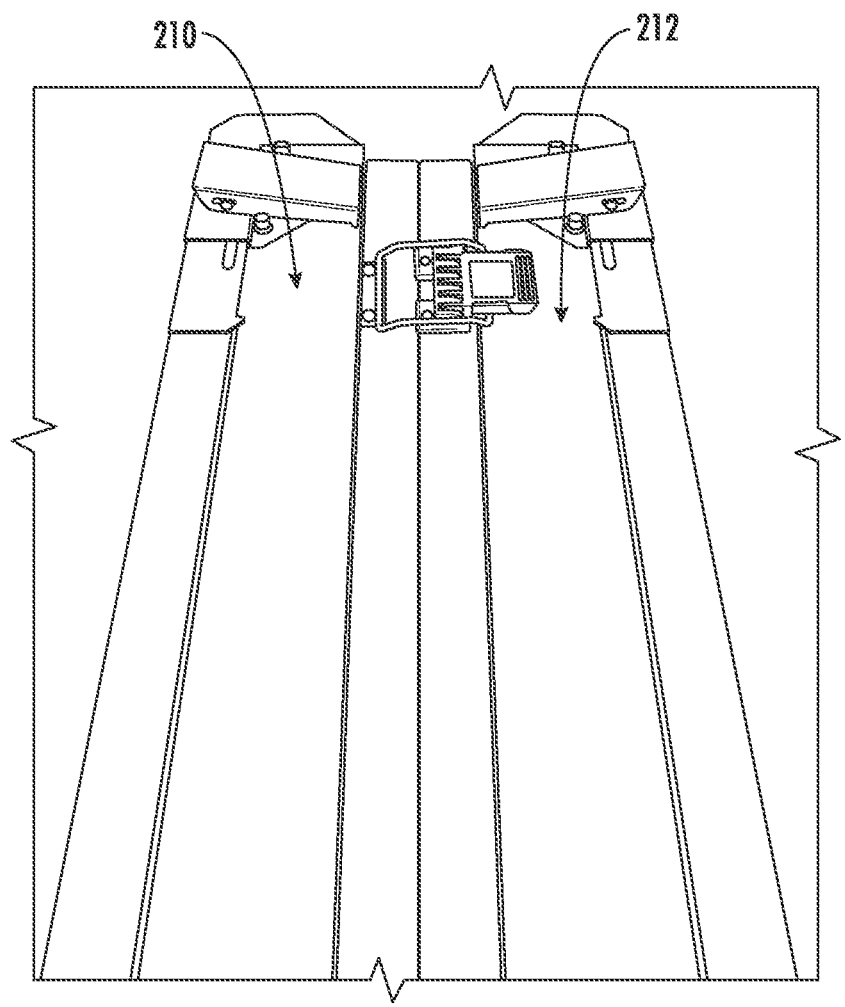
FIG. 24 is a detailed perspective view from above of the support system of FIG. 18, according to an exemplary embodiment.

Referring to FIGS. 18-25, various aspects of a foldable support system 205, including two support structures 210, is depicted. Support structure 210 is substantially the same as support structure 10 and support structure 110 except for the differences discussed herein. Support system 205 includes a first support structure 210 and a second support structure 212 coupled together. Second support structure 212 is substantially similar to first support structure 210. A modular and/or stackable unit, shown as modular storage unit 230, is coupled to a top face of the first support structure 210 and the second support structure 212 (FIG. 17). In various embodiments one or more of the first support structure 210 and the second support structure 212 include coupling mechanisms to couple support structure(s) 210, 212 to modular storage unit 230. Referring to FIGS. 19-22, support structure 210 includes a handle for gripping by a user, and one or more moving elements, shown as wheels. Referring to FIGS. 23-24, the first support structure 210 and second support structure 212 are coupled together via one or more securing mechanisms.

Support structure 210 includes housing 260. A first support element, such as a first leg 266, is pivotally coupled to housing 260 at first end 262. A second support element, such as a second leg 268, is pivotally coupled to housing 260 at second end 264 opposite first end 262. The first leg 266 and the second leg 268 are configured to collectively support the housing 260. In use, legs 266, 268 pivot out of housing 260 to support housing 260 in a horizontal orientation above the ground.

In a specific embodiment, support structure 210 includes first coupling element, shown as lip 270, coupled to housing 260 and a second coupling element, shown as latch 272, coupled to housing 260. In use, two support structures 210 couple together via lip 270 on a first support structure 210 coupling to latch 272 on a second support structure 212 (FIG. 22). In various embodiments, one or more wheels 274 are detachably couple to housing 260.

Figure 25:
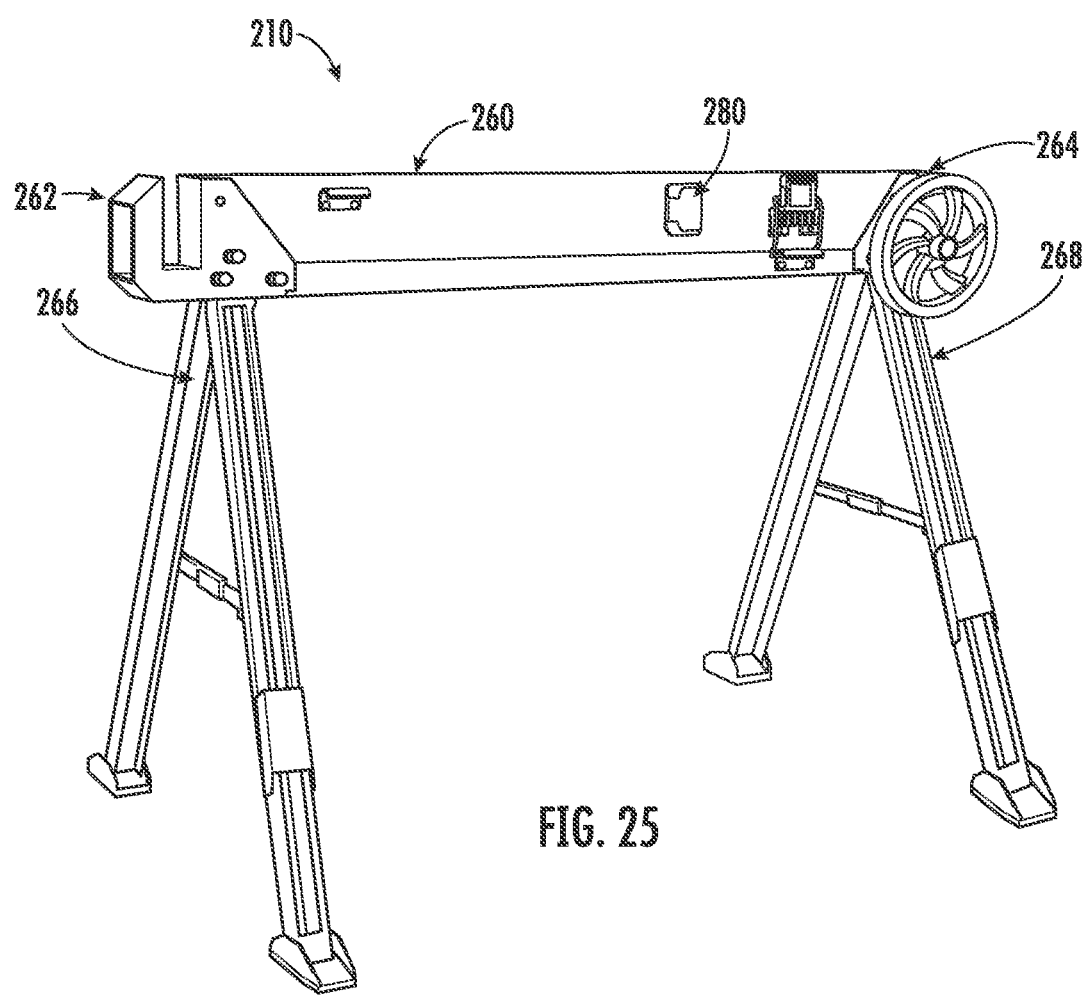
FIG. 25 is a perspective view of a portion of the support system of FIG. 18, according to an exemplary embodiment.
Figure 26:
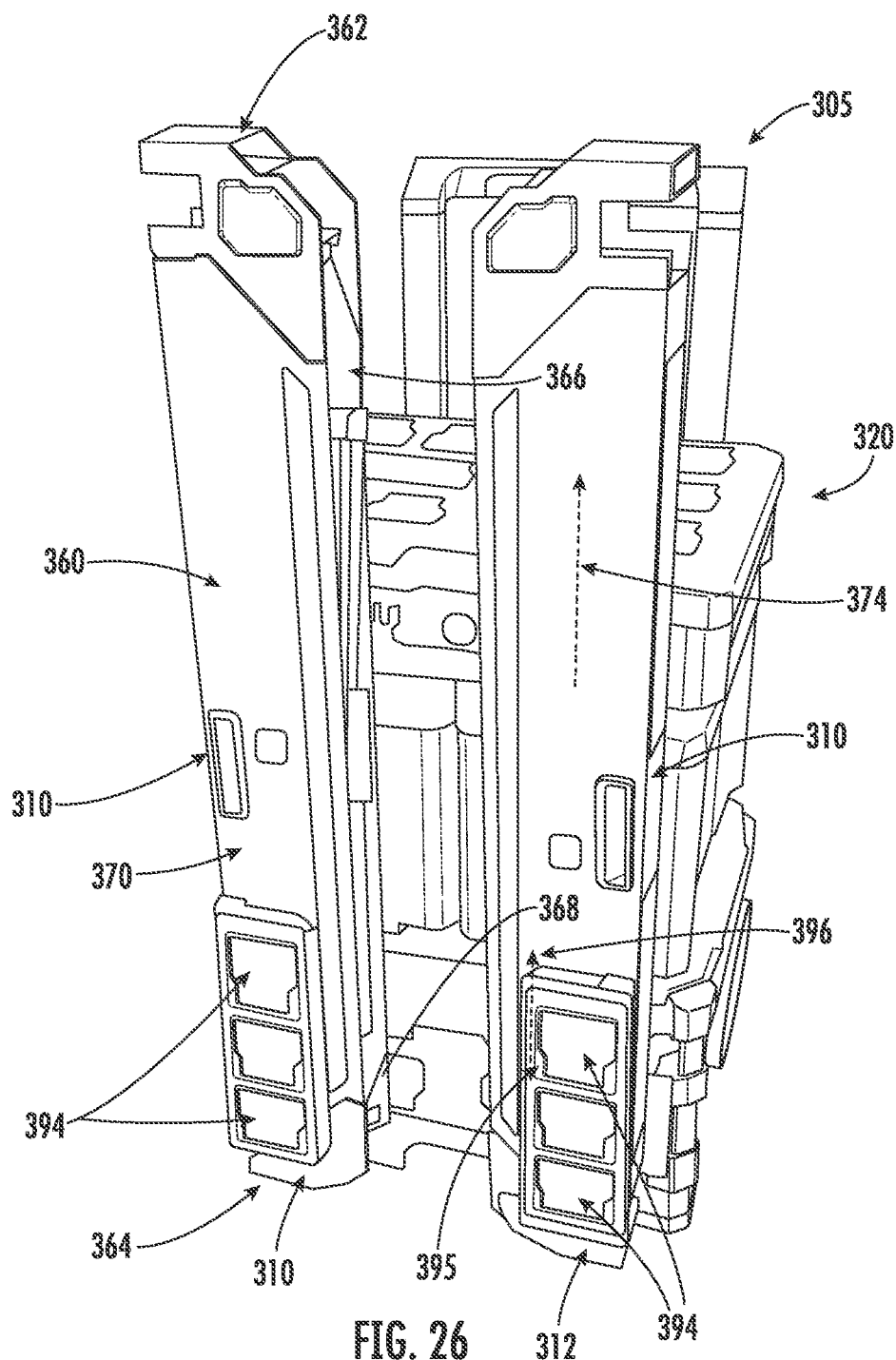
FIG. 26 is a perspective view of a support system coupled to a modular system, according to an exemplary embodiment.
Figure 27:
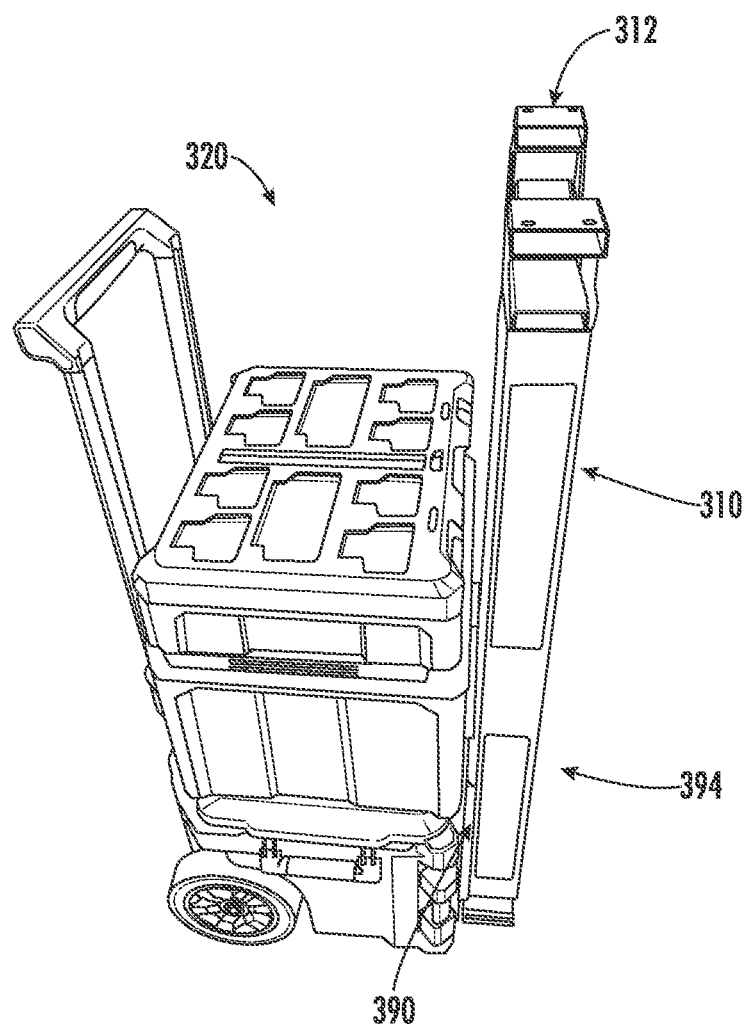
FIG. 27 is a perspective view of the support system of FIG. 26 in front of the modular system of FIG. 26, according to an exemplary embodiment.

Referring to FIG. 25, female coupler 280 is coupled to housing 260, and the female coupler 280 is configured to couple to a first surface of a stackable storage unit, such as at second end 264. Female coupler 280 is substantially similar to other female couplers described herein, such as coupling components 94 and/or coupling components 92.

Figure 28:
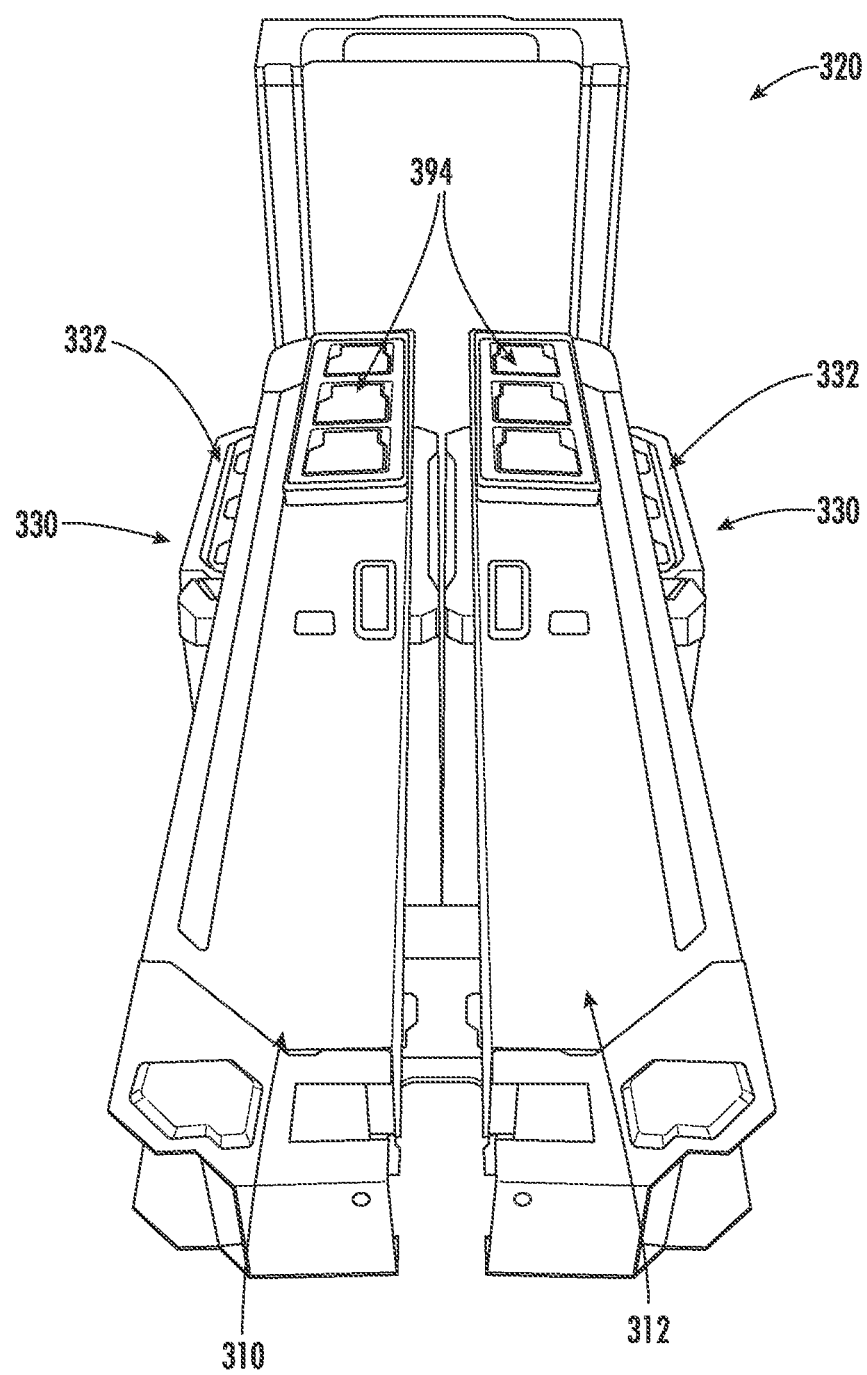
FIG. 28 is a perspective view of the support system of FIG. 26 coupled to a top of the modular system of FIG. 26, according to an exemplary embodiment.
Figure 29:
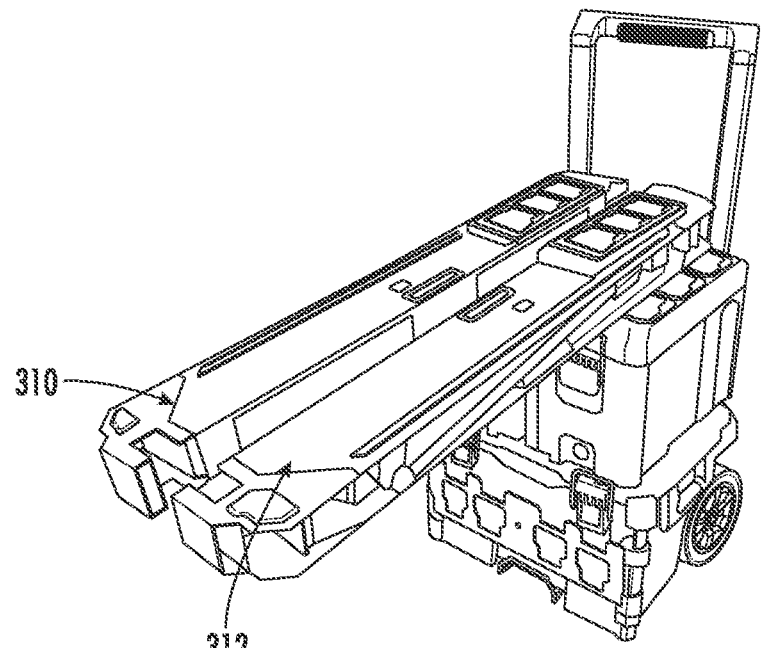
FIG. 29 is a perspective view of the support system of FIG. 26 coupled to a top of the modular system of FIG. 26, according to an exemplary embodiment.
Figure 30:
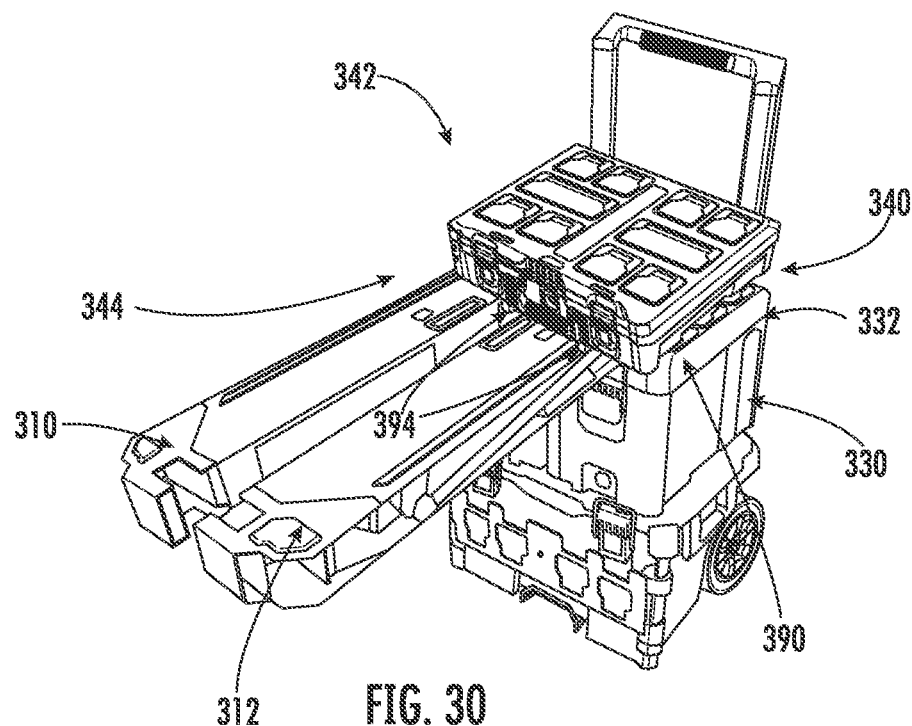
FIG. 30 is a perspective view of the support system of FIG. 26 coupled to the modular system of FIG. 26, according to an exemplary embodiment.
Figure 31:
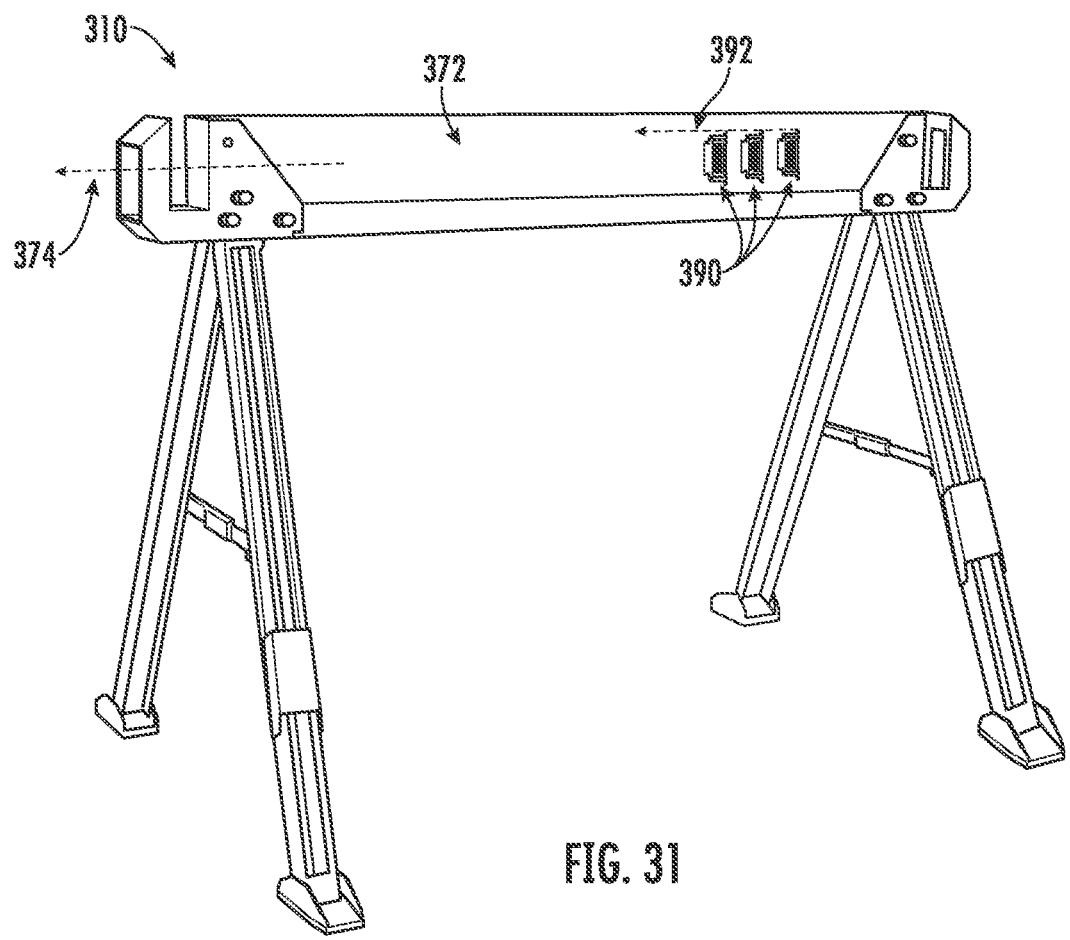
FIG. 31 is a perspective view of a portion of the support system of FIG. 26, according to an exemplary embodiment.

Referring to FIGS. 26-31, various aspects of a support system 305, including two support structures 310, is depicted. Support structure 310 is substantially the same as support structure 10, support structure 110, and support structure 210 except for the differences discussed herein. In particular, support structure 310 is substantially the same as support structure 210 except for the differences discussed herein. Support system 305 includes first support structure 310 and a second support structure 312 coupled together. In various embodiments one or more of first support structure 310 and second support structure 312 include coupling mechanisms to couple to a modular system, shown as modular storage system 320. Support structure 310 can be coupled to various surfaces of modular storage system 320, including without limitation a front surface (FIG. 26) and a top surface (FIG. 28). In a specific embodiment, support structure 310 includes coupling mechanisms on opposing surfaces, thereby permitting support structure 310 to be coupled to a top of modular storage system 320 and a modular unit, shown as modular storage unit 330, to be coupled to a top of support structure 310 (FIG. 30).

Support structure 310 includes housing 360. A first support element, such as a first leg 366, is pivotally coupled to housing 360 at first end 362. A second support element, such as a second leg 368, is pivotally coupled to housing 360 at second end 364. Housing 360 includes first surface 370 and opposing second surface 372.

One or more coupling elements, shown as plurality of coupling components 394 (e.g., female couplers), are coupled to first surface 370 of housing 360 of support structure 310. One or more coupling elements, shown as plurality of coupling components 390 (FIG. 31), such as male couplers, are coupled to second surface 372 of housing 360 of support structure 310 opposite the first surface 370. In various embodiments, coupling components 394 are substantially the same as coupling components 94 and/or coupling components 92, and coupling components 390 are substantially the same as coupling components 90.

In various embodiments, coupling components 390 (e.g., male couplers) include tongues that extend along axis 392, which is parallel to longitudinal axis 374 of housing 360, such as the tongues of each of coupling components 390 extend along an axis 392 parallel to axis 374. In various embodiments, coupling components 394 (e.g., female couplers) include ribs 395 that extend along axis 396, which is parallel to longitudinal axis 374 of housing 360.

Referring to FIG. 30, a plurality of coupling components 390 are configured to couple to an upper surface 332 of modular storage unit 330. A plurality of coupling components 394 are configured to couple to a lower surface 344 of a modular storage unit 340 opposite upper surface 342 of modular storage unit 340.

In a specific embodiments, support structure 10, support structure 110, support structure 210, and support structure 310 include one or more coupling components, latches and/or recesses that are compatible with the coupling mechanism(s) described in International Patent Application No. PCT/US2018/044629, which is incorporated herein in its entirety.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A foldable support structure comprising:
a first wall;
a second wall pivotally coupled to the first wall such that the first wall and second wall actuate between an open configuration and a closed configuration, the first wall and the second wall configured to collectively support the foldable support structure in an upright orientation when the second wall and first wall are arranged in an open configuration;
a third wall pivotally coupled to the first wall, the third wall configured to interface with the second wall when the second wall and first wall are arranged in an open configuration; and
a first plurality of coupling components extending from a first face of the third wall, the first plurality of coupling components configured to couple to a lower surface of a stackable storage unit.

2. The foldable support structure of claim 1, the first plurality of coupling components comprising a plurality of female couplers, each of which comprises a rib extending above and offset from a recessed portion of the respective female coupler.

3. The foldable support structure of claim 1, the first plurality of coupling components comprising a plurality of female couplers, each of which comprises two ribs extending above and offset from a recessed portion of the respective female coupler.

4. The foldable support structure of claim 1, comprising a second plurality of coupling components extending from a second face of the third wall opposite the first face, the second plurality of coupling components configured to couple to an upper surface of the stackable storage unit.

5. The foldable support structure of claim 4, the first plurality of coupling components comprising a plurality of female couplers, each of which comprises a rib extending above and offset from a recessed portion of the respective female coupler, and the second plurality of coupling components comprising a plurality of male couplers, each of which comprises a tongue extending above and offset from the second face of the third wall.

6. The foldable support structure of claim 5, a first female coupler of the plurality of female couplers comprising a first rib extending along a first axis, a first male coupler of the plurality of male couplers comprising a first tongue extending along a second axis, the first axis and the second axis are parallel to each other.

7. The foldable support structure of claim 1, wherein the first wall is pivotally coupled to the second wall such that an upper end of the first wall is pivotally coupled to an upper end of the second wall.

8. The foldable support structure of claim 7, wherein the upper end of the first wall and the upper end of the second wall are configured to collectively support an object placed on the foldable support structure when the foldable support structure is arranged in the open configuration and the upright orientation.

9. The foldable support structure of claim 1, wherein the first plurality of coupling components comprise a first plurality of female couplers, the foldable support structure comprising a second plurality of female couplers coupled to and extending from the first wall.

10. The foldable support structure of claim 9, the third wall actuating with respect to the first wall between a closed configuration and an open configuration, the third wall comprising an aperture configured to receive a protrusion extending from the second wall when the third wall is arranged in the open configuration.

11. The foldable support structure of claim 9, each of the second plurality of female couplers configured to couple to the lower surface of the stackable storage unit.

* * * * *